United States Patent
Bedard et al.

(10) Patent No.: US 12,546,723 B2
(45) Date of Patent: Feb. 10, 2026

(54) VISUAL INSPECTION APPARATUS AND SYSTEM ASSOCIATED THEREWITH

(71) Applicant: Rinnovision Inc., Saint-Marie (CA)

(72) Inventors: Norman Bedard, St-Joseph-de-Coleraine (CA); Patrick Lamontagne, Saint-Bernard (CA)

(73) Assignee: Rinnovision Inc., Sainte-Marie (CA)

( * ) Notice: Subject to any disclaimer, the term of this patent is extended or adjusted under 35 U.S.C. 154(b) by 227 days.

(21) Appl. No.: 17/778,447

(22) PCT Filed: Nov. 13, 2020

(86) PCT No.: PCT/CA2020/051545
§ 371 (c)(1),
(2) Date: May 20, 2022

(87) PCT Pub. No.: WO2021/097558
PCT Pub. Date: May 27, 2021

(65) Prior Publication Data
US 2022/0412895 A1    Dec. 29, 2022

Related U.S. Application Data

(60) Provisional application No. 62/938,401, filed on Nov. 21, 2019.

(51) Int. Cl.
*G01N 21/88* (2006.01)
*G01N 21/954* (2006.01)

(52) U.S. Cl.
CPC ....... *G01N 21/8806* (2013.01); *G01N 21/954* (2013.01); *G01N 2021/9544* (2013.01)

(58) Field of Classification Search
CPC ............. G01N 21/8806; G01N 21/954; G01N 2021/9544; G01N 2021/8816;
(Continued)

(56) References Cited

U.S. PATENT DOCUMENTS 6,157,018 A    12/2000  Ishiguro et al.
6,369,849 B1 *  4/2002  Rzyski ................... H04N 23/58
                                                        348/82
(Continued)

FOREIGN PATENT DOCUMENTS

CN        104913740 A    9/2015
CN        204729861 U   10/2015
(Continued)

OTHER PUBLICATIONS

English translation of JP2017-068160 (Year: 2017).*
(Continued)

*Primary Examiner* — Christina A Riddle
(74) *Attorney, Agent, or Firm* — MARSHALL, GERSTEIN & BORUN LLP

(57) ABSTRACT

The present disclosure relates to an inspection apparatus for visually inspecting a substantially dark area. The inspection apparatus includes an inspection casing having a sidewall extending between a casing inspection end and a connecting end, an omnidirectional video camera mounted to the casing inspection end of the inspection casing; and a light-emitting assembly at least partially contained in the inspection casing. The sidewall of the inspection casing has a light-permeable section extending along 360 degrees and the light-emitting assembly is configured to emit light through the light-permeable section and from the casing inspection end, and away therefrom. An inspection system is also described.

20 Claims, 19 Drawing Sheets

(58) Field of Classification Search
CPC ....... G01N 2021/8829; G01N 21/9515; G01N 21/8851; G01N 2201/062; G01N 21/88; G01N 21/95; G03B 37/005; G03B 37/04; G03B 15/03; G03B 17/561; G03B 17/08; G03B 17/55; G03B 2215/0542; G03B 2215/0567; G03B 2215/0571; G03B 15/0442; G03B 15/05; G03B 37/00; G03B 37/02; H04N 23/56; H04N 23/698; H04N 23/45; H04N 23/51; H04N 23/555; H04N 23/50; H04N 23/63; H04N 5/265; H04N 7/183; H04N 23/12; H04N 23/13; H04N 23/54; H04N 23/58; H04N 23/695; H04N 23/90; H04N 25/134; H04N 7/10; H04N 7/181; H04N 7/185; F16L 2101/30; F16L 55/265; A61B 1/0661; A61B 1/0684; A61B 1/042; A61B 1/05; A61B 1/051; A61B 1/053; A61B 1/055; A61B 1/04; A61B 1/00006; A61B 1/00009; A61B 1/00181; E21B 47/002; E21B 47/007; E21B 47/017; G02B 13/06; G06T 3/4015; G06T 3/4038
USPC ................ 356/237.1–237.6, 241; 250/208.1; 348/36, E5.03
See application file for complete search history.

(56) References Cited

U.S. PATENT DOCUMENTS

| | | | |
|---|---|---|---|
| 10,295,888 | B2 | 5/2019 | Brunt |
| 10,440,332 | B2 | 10/2019 | Olsson |
| 10,697,901 | B2 | 6/2020 | Kesselberg |
| 2004/0249247 | A1 | 12/2004 | Iddan |
| 2012/0211649 | A1* | 8/2012 | Hallundbaek ........ G01N 21/954 250/267 |
| 2016/0259237 | A1 | 9/2016 | Harris et al. |
| 2016/0261829 | A1 | 9/2016 | Olsson et al. |
| 2017/0366812 | A1* | 12/2017 | Abbas .................. H04N 13/161 |
| 2018/0024417 | A1* | 1/2018 | Brunt ................. G03B 15/0442 362/8 |
| 2019/0017941 | A1 | 1/2019 | Gillham et al. |
| 2019/0104252 | A1 | 4/2019 | Starr et al. |
| 2020/0154043 | A1 | 5/2020 | Cogal et al. |

FOREIGN PATENT DOCUMENTS

| | | |
|---|---|---|
| CN | 205139458 U | 4/2016 |
| CN | 106371281 A | 2/2017 |
| CN | 206311838 U | 7/2017 |
| CN | 206540837 U | 10/2017 |
| CN | 207036730 U | 2/2018 |
| CN | 208750331 U | 4/2019 |
| DE | 202004016828 U1 | 5/2005 |
| DE | 102017004475 A1 | 11/2018 |
| DE | 102016113406 B4 | 2/2022 |
| EP | 1348371 A1 | 10/2003 |
| JP | 116800 A | 1/1999 |
| JP | 2002040335 A | 2/2002 |
| JP | 2014145646 A | 8/2014 |
| JP | 2016057602 A | 4/2016 |
| JP | 2017068160 A * | 4/2017 |
| JP | 2019184482 A | 10/2019 |
| JP | 7020260 B2 | 2/2022 |
| WO | 2018064159 A1 | 4/2018 |

OTHER PUBLICATIONS

English translation of DE202004016828. (Year: 2005).*
European Patent Office communication of Third Party Observation for Application No. 20891124.8, dated Jul. 15, 2025.

* cited by examiner

VISUAL INSPECTION APPARATUS AND SYSTEM ASSOCIATED THEREWITH

RELATED APPLICATIONS

This application is a § 371 national stage entry of International Application No. PCT/CA2020/051545, filed on Nov. 13, 2020, and entitled "VISUAL INSPECTION APPARATUS AND SYSTEM ASSOCIATED THEREWITH, which claims priority under applicable laws to U.S. provisional application No. 62/938,401 filed on Nov. 21, 2019. The content of these applications is incorporated herein by reference in its entirety for all purposes.

TECHNICAL FIELD

The present disclosure relates to a visual inspection apparatus and to an system associated thereof.

BACKGROUND

Pipes, such as the one provided for rain and waste water disposal, must be inspected prior to use and periodically thereafter to, for example, determine whether any cracks or flaws are present, which would indicate an actual or potential hazardous condition or obstruction.

There already exists in the art, or alternatively on the market, devices and systems for visually inspecting pipes involving lighting devices (or assemblies) and cameras, which could be provided within the pipe from an external location therefrom. These arrangements generally include a lighting system (or light-emitting assembly) to illuminate the interior of the pipe, and a video camera for providing imaging of the interior of the pipe.

The existing technologies however present some drawbacks. For example, inspecting the pipes using such apparatuses and/or systems can be time consuming, due to the fact that the lighting systems provided thereon provide illumination in one direction only and further, due to the fact that the operator or user needs to maneuver the apparatus with enough precision to obtain a full imaging of the interior of the pipe (according to 360 degrees), as the lenses point in one direction only. Moreover, more than often, a cable will extend from the section of the pipe being inspected to the external remote location, being troublesome for the operator.

In view of the above, there is therefore a need for improved inspection apparatuses and inspection systems which, by virtue of their designs and components, would be able to overcome or at least minimize some of the above-discussed concerns.

SUMMARY

According to a general aspect, there is provided an inspection apparatus for visually inspecting a substantially dark area. The inspection apparatus comprises: an inspection casing having a sidewall extending between a casing inspection end and a connecting end, the sidewall having a light-permeable section extending along at least 360 degrees; a 360-degree video camera secured to the casing inspection end of the inspection casing; and a light-emitting assembly mounted to the inspection casing and configure to emit light through the light-permeable section of the sidewall of the inspection casing and away therefrom, and from the casing inspection end of the inspection casing and away therefrom.

According to another general aspect, there is provided an inspection apparatus for visually inspecting a substantially dark area. The inspection apparatus comprises: an inspection casing having a sidewall extending between a casing inspection end and a connecting end, the sidewall having a light-permeable section extending along 360 degrees; an omnidirectional video camera mounted to the casing inspection end of the inspection casing; and a light-emitting assembly at least partially contained in the inspection casing and configured to emit light through the light-permeable section of the sidewall of the inspection casing and away therefrom, and from the casing inspection end of the inspection casing and away therefrom.

According to still another general aspect, there is provided a visual inspection apparatus of a physically constrained area. The visual inspection apparatus comprises: an inspection casing having a sidewall extending between a casing inspection end and a connecting end, the inspection casing having at least one light-permeable section extending along at least 360 degrees and including a peripheral light-permeable section provided in the sidewall and extending along 360 degrees; an omnidirectional camera having a 360 degrees field of view in at least one plane, the omnidirectional camera being mounted to the casing inspection end of the inspection casing and protruding forwardly and outwardly of the inspection casing; and a light-emitting assembly at least partially disposed within the inspection casing and configured to emit light through the at least one light-permeable section and outwardly of the inspection casing, and configured to illuminate the 360 degrees field of view of the omnidirectional camera.

In an embodiment, the inspection casing comprises a casing inspection end wall having at least one light-permeable section. The casing inspection end wall can be light-permeable. The omnidirectional video camera can extend forwardly of the casing inspection end wall and outwardly of the inspection casing.

In an embodiment, the omnidirectional video camera is at least one of detachably rotatably and detachably pivotably mounted to the casing inspection end of the inspection casing.

In an embodiment, the inspection apparatus further comprises a camera protection assembly mounted to the inspection casing and protruding forwardly from the casing inspection end and including at least one post guard having a section extending forwardly of the omnidirectional video camera. The at least one post guard can comprise a plurality of spaced-apart post guards extending peripherally of the omnidirectional video camera.

In an embodiment, the inspection casing comprises a central section and a casing inspection end portion including at least partially the light-permeable section of the sidewall, the casing inspection end portion being detachably mounted to the central section and defining therewith a light-emitting compartment containing at least partially the light-emitting assembly. The casing inspection end portion can be made of a light-permeable material. The central section can define a power supply receiving compartment and the light-emitting assembly can comprise a power supply at least partially contained in the power supply receiving compartment.

The light-emitting assembly can comprise a light-emitting device at least partially contained in the light-emitting compartment. The inspection casing can comprise a partition wall separating the light-emitting compartment from the central section and the light-emitting device comprises a plurality of spaced-apart lighting-emitting devices mounted to the partition wall. The light-emitting assembly can comprise a light redirecting module in the light-emitting compartment, the light redirecting module redirecting at least some of a light emitted from the light-emitting devices radially and outwardly of the inspection casing in a 360-degree lighting pattern and forwardly of the inspection casing through the light-permeable section.

The light redirecting module can comprise an optical unit including at least one peripheral wall wherein the at least one peripheral wall converges towards the partition wall with the light emitted from the lighting-emitting devices being at least partially directed towards the conical-shaped peripheral wall of the optical unit. The at least one peripheral wall of the optical unit can define at least one of a frusto-conical shape, a truncated hemisphere shape, a truncated pyramid shape, and a conical shape. The conical-shaped peripheral wall of the optical unit can be made of one of a light-permeable material and a light-reflective material.

The optical unit can comprise one or more recesses defined in the conical-shaped peripheral wall with a recessed flat mirror defining an oblique angle with the partition wall being located within the one or more recesses and wherein at least one of the lighting-emitting devices superposed to the partition wall can be aligned with the recesses in a direction of an inspection casing centerline.

In an embodiment, the light-emitting assembly comprises a power supply including at least one rechargeable battery contained in the inspection casing and the inspection casing comprises at least one power supply connector operatively connected to the rechargeable battery to recharge same.

In an embodiment, the inspection casing comprises an inspection casing centerline and the light-emitting assembly comprises a forward light-emitting device mounted to a forwardly-located surface of the inspection casing, extending substantially normal to the inspection casing centerline, and a peripheral light-emitting device mounted to a surface of the inspection casing extending substantially parallel to the inspection casing centerline and emitting light radially and outwardly from the inspection casing through the light-permeable section of the sidewall, forming a 360-degree lighting pattern.

According to a further general aspect, there is provided a visual inspection system comprising the inspection apparatus as described above and further comprising a telescopic manipulation shaft having a casing connecting end detachably securable to the inspection casing.

According to still another general aspect, there is provided a visual inspection system comprising the visual inspection apparatus as described above and further comprising a computer readable media operatively and remotely connected to the omnidirectional camera for receiving imaging from the omnidirectional camera.

DETAILED DESCRIPTION

Figure 1:
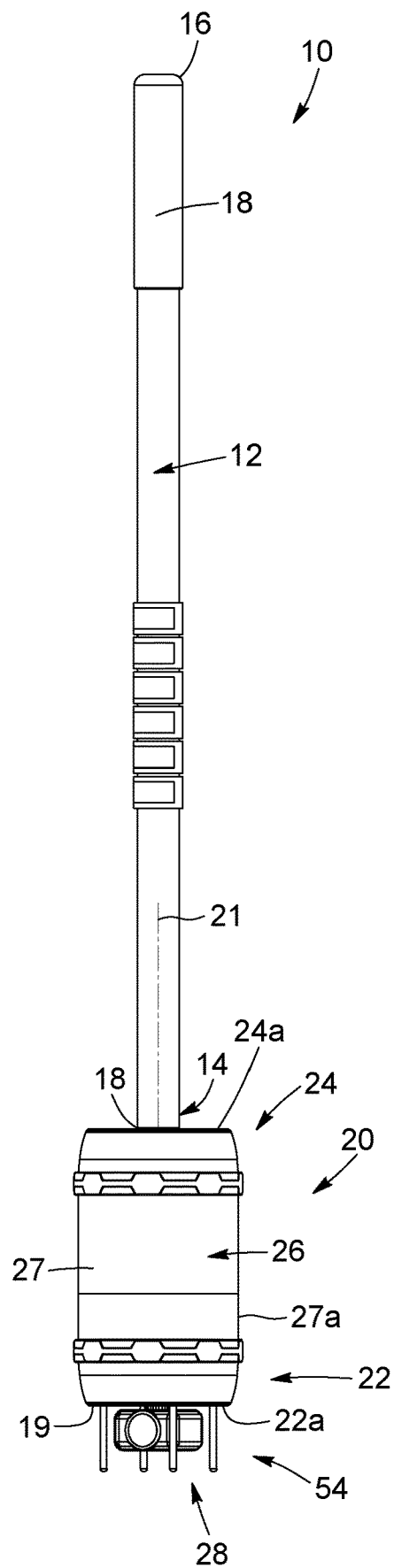
FIG. 1 is a side elevation view of an inspection apparatus in accordance with an embodiment.

In the following description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures or described in the present disclosure are embodiments only, given solely for exemplification purposes.

Furthermore, in the context of the present description, it will be considered that all elongated objects will have an implicit "longitudinal axis" or "centerline", such as the longitudinal axis of a shaft for example, or the centerline of a biasing device such as a coiled spring, for example, and that expressions such as "connected" and "connectable", or "mounted" and "mountable", may be interchangeable, in that the present inspection apparatus or inspection system also relate to kits with corresponding components for assembling a resulting fully-assembled and fully-operational inspection apparatus or inspection system.

It is appreciated that the present inspection apparatus or inspection system can be used to inspect any substantially dark enclosure, such as, without limitation, a pipe, a reservoir, a section of a building, a cave, a tunnel, a mine, any area that needs to be filmed and/or illuminated, and the like.

Moreover, components of the present inspection apparatus, inspection system and/or steps of the method(s) described herein could be modified, simplified, altered, omitted and/or interchanged, without departing from the scope of the present disclosure, depending on the particular applications which the present lift is intended for, and the desired end results, as briefly exemplified herein and as also apparent to a person skilled in the art.

In addition, although the embodiments as illustrated in the accompanying drawings comprise various components, and although the embodiments of the present inspection apparatus or inspection system and corresponding portion(s)/part(s)/component(s) as shown consist of certain geometrical configurations, as explained and illustrated herein, not all of these components and geometries are essential and thus should not be taken in their restrictive sense, i.e. should not be taken so as to limit the scope of the present disclosure. It is to be understood, as also apparent to a person skilled in the art, that other suitable components and cooperation thereinbetween, as well as other suitable geometrical configurations may be used for the present inspection apparatus and inspection system and corresponding portion(s)/part(s)/component(s) according to the present inspection apparatus and inspection system, as will be briefly explained herein and as can be easily inferred herefrom by a person skilled in the art, without departing from the scope of the present disclosure.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

Moreover, it will be appreciated that positional descriptions such as "forward", "front", "rearward", "rear" and the like should, unless otherwise indicated, be taken in the context of the figures and correspond to the position and orientation of the visual inspection apparatus and corresponding parts when used for inspection, with the "front" corresponding to a position closer to an inspection camera and the "rear" corresponding to a position closer to a manipulation shaft of the visual inspection apparatus. Positional descriptions should not be considered limiting.

In the present description, the term "light-permeable" is intented to include transparent materials, translucid materials, semi-transparent materials, translucent materials and all other materials that allow visible light to pass through at least partially or diffusely. Examples of light permeable material include a rigid or semi-rigid sheet material, for example of glass, acrylic, polycarbonate, copolyester, polyethylene terephthalate, urethane or silicone rubber, polyvinyl chloride, crystal polystyrene- polypropylene or polyester, or filmic material, for example of polycarbonate, polyvinyl chloride polypropylene or polyester.

The present disclosure describes visual inspection apparatuses and visual inspection systems which allow for an improved visual inspection of a substantially dark enclosure or cavity or environment that needs to be visually inspected or filmed (e.g., the interior of a pipe).

Referring now to the drawings and more particularly to the non-limitative embodiment shown in FIGS. 1 to 9, there is provided a first non-limitative embodiment of an inspection apparatus 10 for visually inspecting a substantially dark enclosure of cavity, a channel, or a conduit (not shown). The visual inspection apparatus 10 includes an elongated manipulation shaft 12, which can be a telescopic shaft 12, which extends between a casing connecting end 14 and a shaft free end 16 (or a shaft manipulation end), opposed to the casing connecting end 14. As illustrated in the non-limitative embodiment shown in FIGS. 1 and 2, the elongated shaft 12 includes a handle portion 18, including the shaft manipulation end 16, for providing an improved maneuverability of the visual inspection apparatus 10. In a non-limitative embodiment such as the one shown, the manipulation shaft 12 can be a telescopic shaft, which can include a plurality of concentric tubular sections designed to slide into one another as can be easily understood by a person skilled in the art to which the present visual inspection apparatus 10 pertains. Therefore, the manipulation shaft 12 is configurable in a compacted configuration for storage and transport purposes and in a plurality of extended configuration of different lengths. In some implementations, the manipulation shaft 12 can further include anti-rotation mechanism(s) to prevent rotation of a concentric tubular section relatively to another. Moreover, for example and without being limitative, the manipulation shaft 12 can extend up to 30 feet, with about six sections.

Still referring to the non-limiting embodiment shown in FIGS. 1 to 9, the visual inspection apparatus 10 further includes an inspection casing 20 which can be releasably securable to the casing mounting end 14 of the elongated shaft 12. In the embodiment shown, the inspection casing 20 defines an inspection casing centerline 21 (FIGS. 1 and 4) and can be divided into a casing inspection end portion 22 (including a casing inspection end wall 22a), a shaft connecting end portion 24 (including a casing connecting end wall 24a) as well as a central portion 26 joining the casing inspection end portion 22 and the shaft connecting end portion 24. Thus, the inspection casing 20 comprises a sidewall 27 extending between the casing inspection end wall 22a and the casing connecting end wall 24a. End sections of the sidewall 27 are part of the casing and shaft connecting end wall 22, 24 while the central section of the sidewall 27 is part of the central section 26. In the embodiment shown, the casing inspection end portion 22 and the shaft connecting end portion 24 (including a casing connecting end wall 24a) are detachably mounted to the central portion 26. It is appreciated that the components of the inspection casing 20 can vary from the embodiment shown.

In the embodiment shown, the casing inspection end wall 22a corresponds to the casing inspection end 19 of the inspection casing 20. Similarly, in the non-limitative embodiment shown, the casing connecting end wall 24a corresponds to a connecting end 18 of the inspection casing 20.

Figure 19:
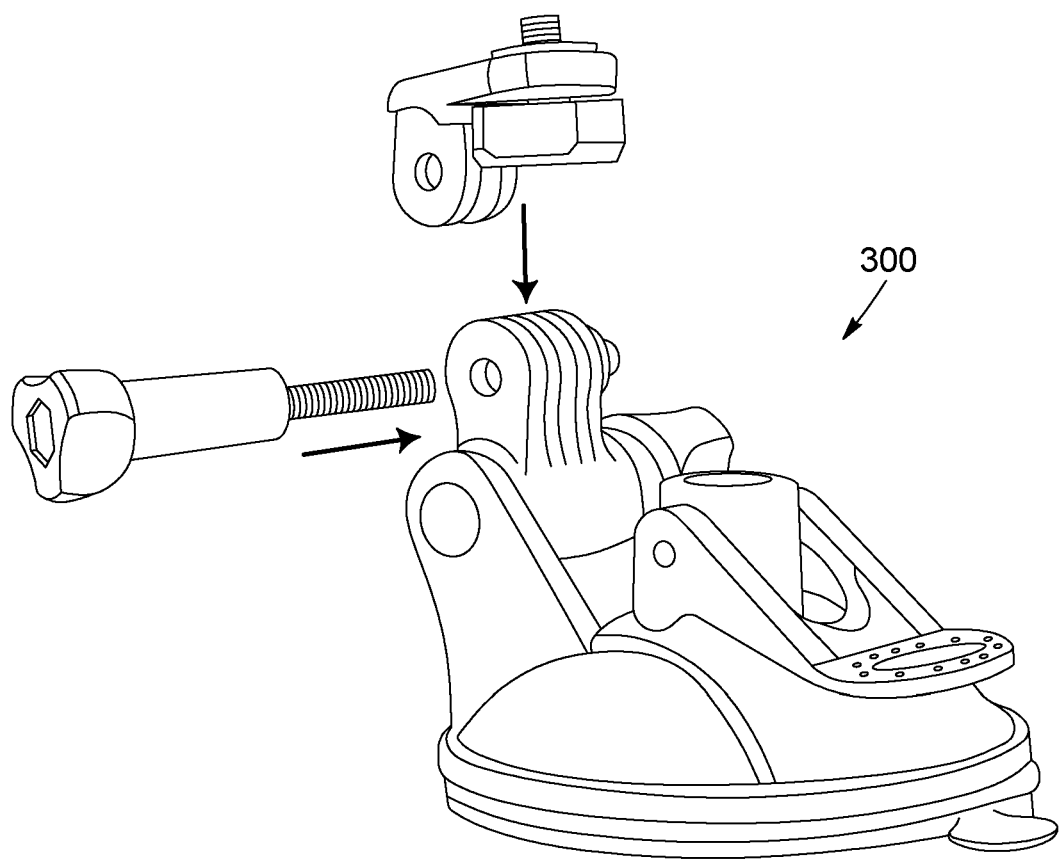
FIG. 19 is a top perspective view of a support, in accordance with an embodiment, configured to detachably receive an inspection apparatus.

In some implementations, instead of providing the inspection casing 20 to be releasably securable to an elongated or telescopic shaft, the inspection casing 20 can be releasably securable to a self-propelled remote control vehicle, for allowing inspection of the pipe or underground structure, or any other vehicle (i.e., car, truck, train, boat, etc.) for filming the environment. The elongated or telescopic shaft can therefore be replaced by a support, such as the one illustrated in FIG. 19, which includes a support 300 and, more particularly, a suction pad to be releasably secured to the self-propelled remote control vehicle (or vehicle). Alternatively, the inspection casing 20 can be releasably securable to a cable.

The inspection casing 20 comprises a light-permeable section extending at least peripherally to allow light to at least partially pass through. More particularly, the sidewall 27 of the inspection casing 20 has a peripheral light-permeable section 27a. In the non-limitative embodiment shown, the light-permeable section 27a extends peripherally along 360 degrees. In an embodiment, at least 75% of the peripheral light-permeable section 27a is light-permeable. Minor portions of the peripheral surface of the inspection casing 20 in the peripheral light-permeable section 27a can be made of a less light-permeable material. If the sidewall 27 includes minor portions being made of a less light-permeable material, their surface area and configuration is not sufficient to prevent peripheral englightment along 360 degrees.

In some implementations, at least a section of the casing inspection end wall 22a is also light-permeable, as it will be described in more details below. Thus, the light-permeable section of the inspection casing 20 extends at least along 360 degrees obtained by the combination of the peripheral light-permeable section 27a and the section of the casing inspection end wall 22a which is also light permeable.

The light-permeable section(s) can be an entirety of the sidewall 27. Alternatively, only a section of the sidewall 27 can be made of the transparent, translucid or semitransparent material, as will be described in more details herein. In the non-limitative embodiment shown, an entirety of the sidewall of the central section 27 is light-permeable. In another embodiment, only a section of the sidewall of the central section 27, along a length thereof but extending peripherally, can be light-permeable.

As shown in the non-limitative embodiment of FIGS. 1 to 5, the light-permeable section(s) of the inspection casing 20 can be made of a transparent material so as to allow light to pass therethrough in totality, or alternatively, the light-permeable section(s) the inspection casing 20 can be made of a translucid or semitransparent material so as to allow light to pass therethrough partially or diffusely.

Still referring to the non-limitative embodiment shown in FIGS. 1 and 3 to 5, the visual inspection apparatus 10 further includes an omnidirectional video (or 360-degree video) camera 28, such as a conventional 360-degree or virtual reality camera known in the art, which is releasably securable to the casing inspection end portion 22 of the inspection casing 20. In the embodiment shown, the video camera 28 protrudes outwardly from the casing inspection end portion 22 when mounted thereto and, more particularly, extends outwardly from the casing inspection end wall 22a when mounted thereto. The omnidirectional video camera 28 is operable so as to provide a 360-degree imaging (peripherally) and forwardly of the environment surrounding the visual inspection apparatus 10. a The omnidirectional video camera 28 has a 360 degrees field of view in at least one plane extending normal to the inspection casing centerline 21. In some implementations, the omnidirectional video camera 28 can be a Garmin® VIRB® 360 waterproof camera with a 5.7K/30 fps resolution and a 4K spherical stabilization, which can capture a complete sphere of high-resolution video and audio. This rugged, waterproof camera can record the full 360 degrees, peripherally and forwardly and is capable of automatically stitching the 4K footage in camera. In some other implementations, the omnidirectional video camera 28 can be a GoPro® 360-degree camera, GoPro® MAX or any other corresponding 360-degree camera.

Thus, in some implementations, the omnidirectional video camera 28 can capture a full 360° viewing surrounding the sidewall 27 (or the central section 26) of the inspection casing 20 (i.e. peripheral viewing) as well as a forward viewing (i.e. forwardly), i.e. what is located in front of the casing inspection end wall 22a.

Figure 4:
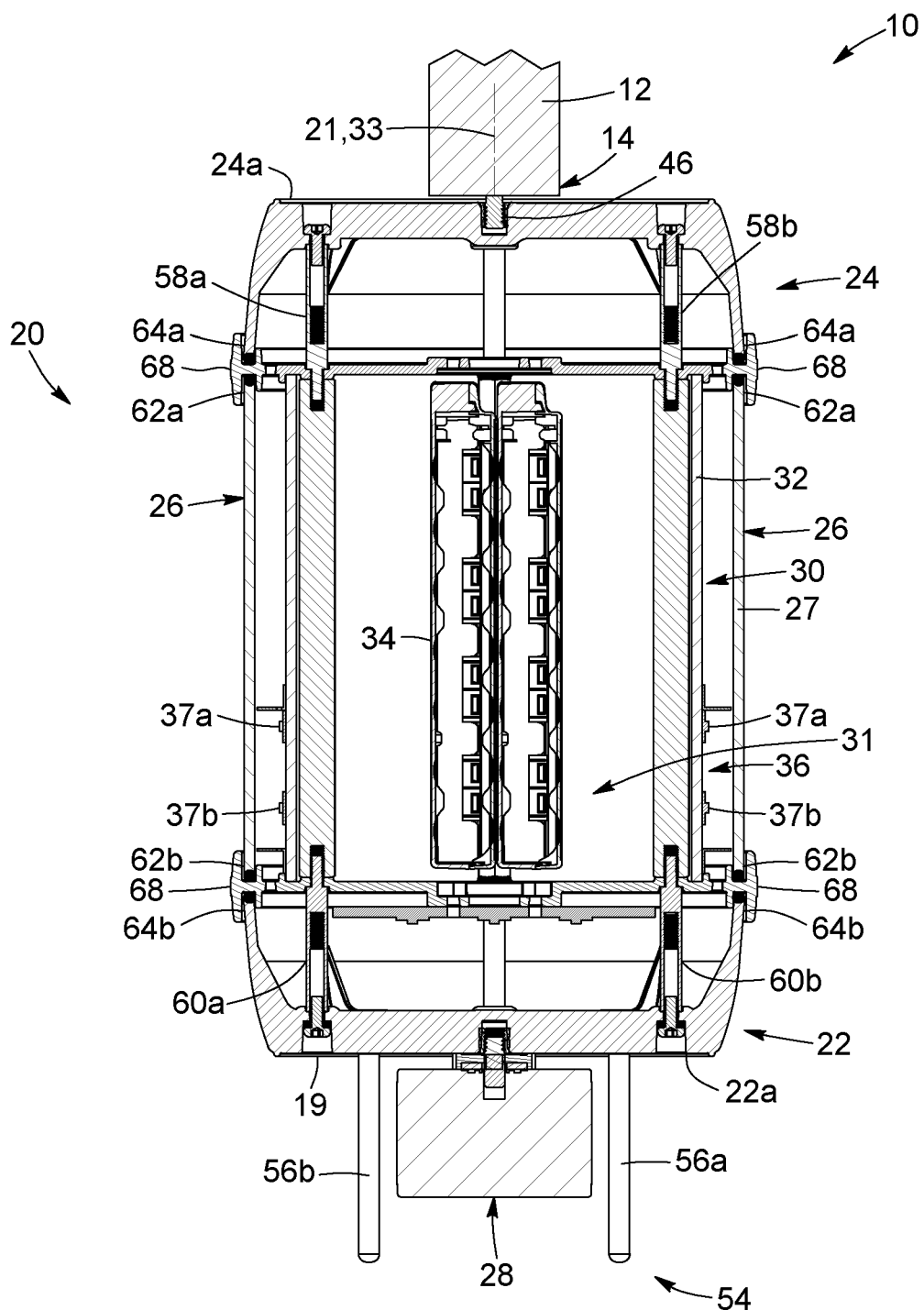
FIG. 4 is a cross-sectional side view of the inspection casing of the inspection apparatus shown in FIG. 1 taken along a first section line.
Figure 5:
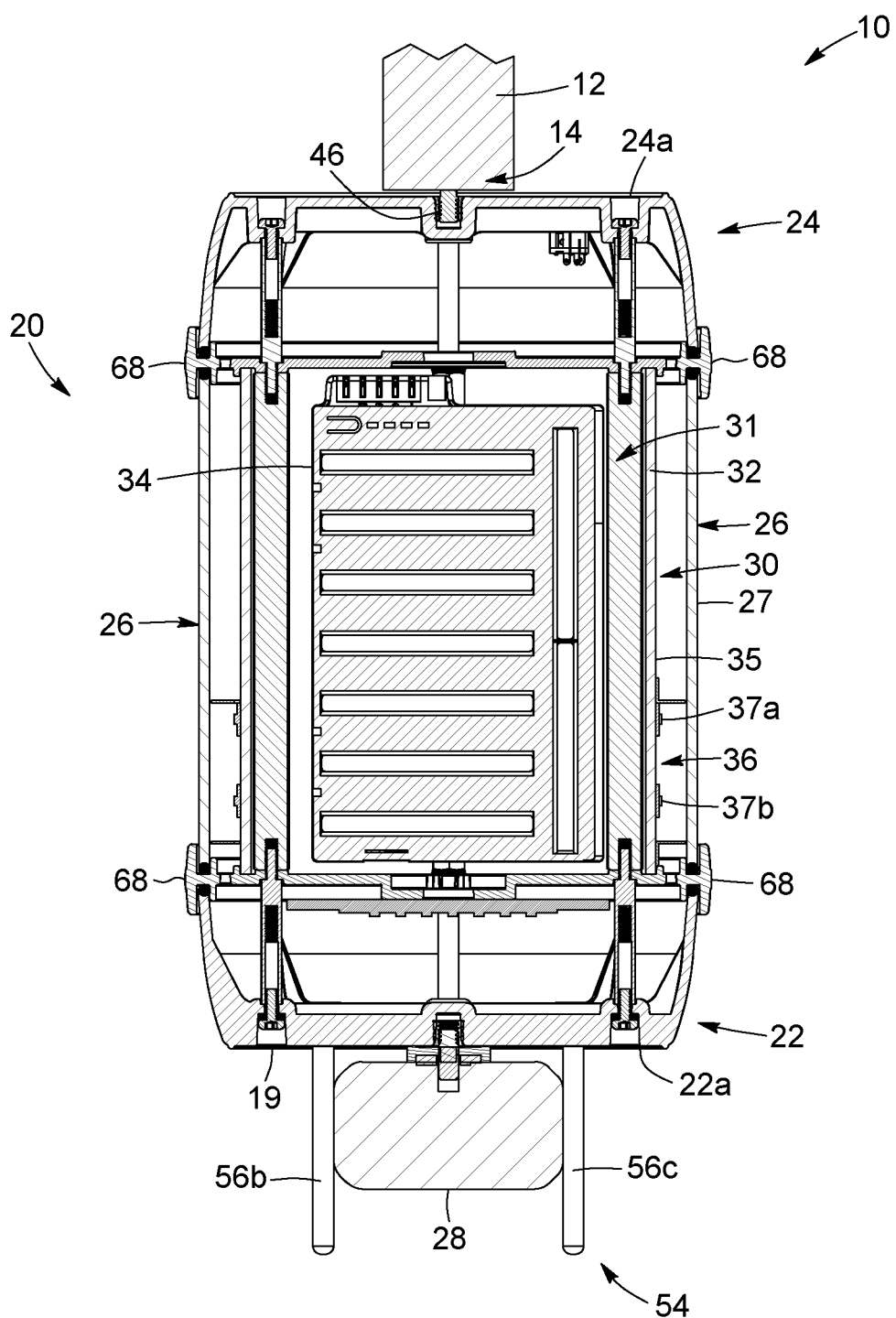
FIG. 5 is another cross-sectional side view of the inspection casing of the inspection apparatus shown in FIG. 1 taken along a second section line, orthogonal to the first section line.
Figure 6:
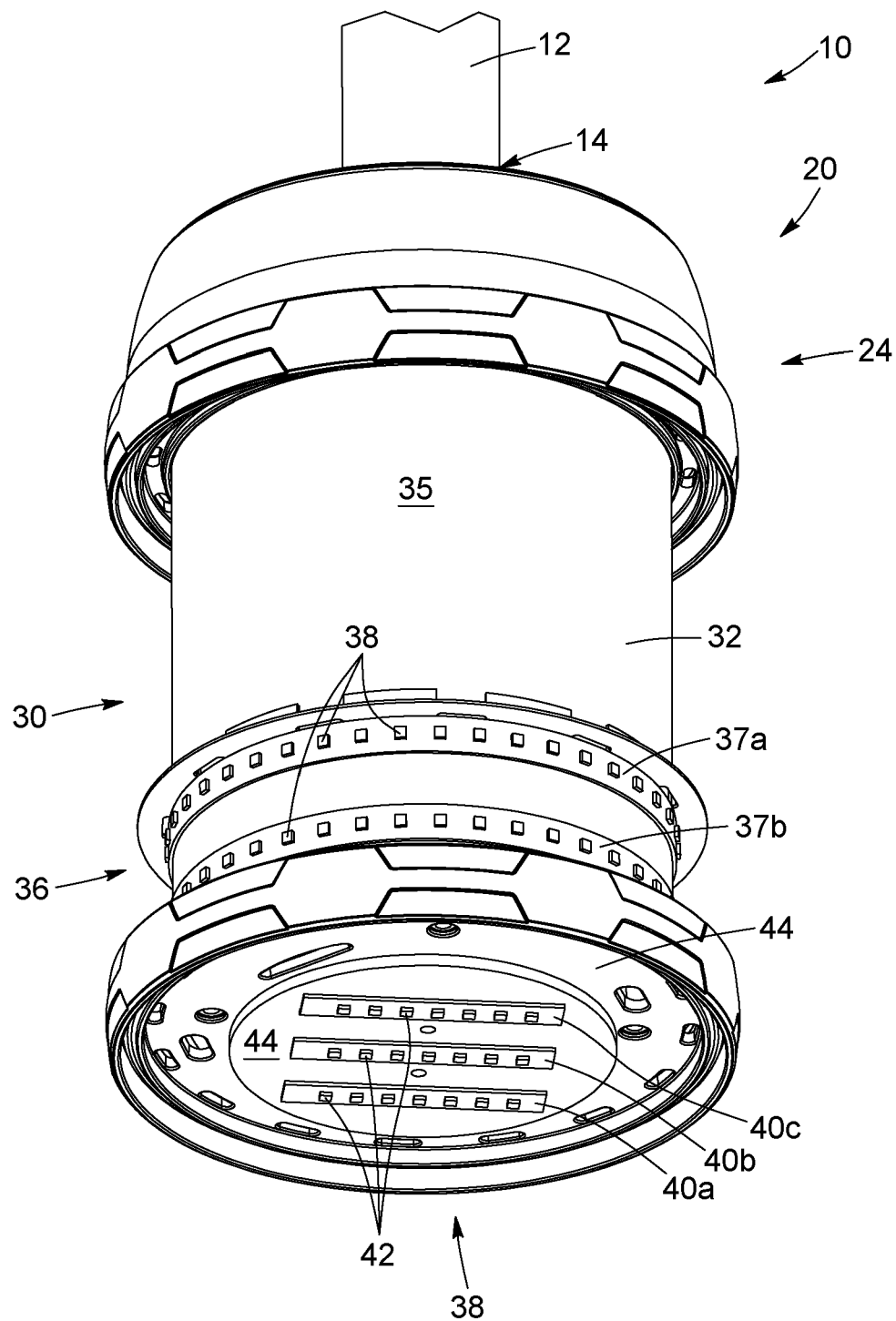
FIG. 6 is a bottom perspective view of the inspection casing of the inspection apparatus, wherein a sidewall of a central section and a casing inspection end portion have been detached and remove to expose a peripheral light-emitting device and a forward light-emitting device of the inspection apparatus.

Still referring to the non-limitative embodiment shown in FIGS. 4 to 6, the visual inspection apparatus 10 further includes a lighting (or light-emitting) assembly 30 which is configured to illuminate the substantially dark environment, or the external environment, during the 360-degree video recording (or alternatively, prior to, or following, the 360-degree video recording). Indeed, the lighting assembly 30 is adapted to emit light normal to or away of the sidewall 27 of the inspection casing 20 and away therefrom, as well as normal to or forwardly of the casing inspection end wall 22a of the inspection casing 20 and away therefrom, to illuminate the substantially dark environment, according to 360 degrees relatively to the inspection casing centerline 21, as well as forwardly and away from the casing inspection end wall 22a.

The lighting assembly 30 can be provided within or mounted to the inspection casing 20 and adapted to emit light normal to the sidewall 27 of the inspection casing 20 and away therefrom, and normal to the casing inspection end 22 of the inspection casing 20 and away therefrom, to illuminate the interior of the substantially dark environment according to 360 degrees relatively to the inspection casing centerline 21 and further forwardly from the casing inspection end 22.

In the non-limitative embodiment shown, the lighting assembly 30 includes a light assembly internal casing 32 provided within the inspection casing 20, in the central section 26 and concentric therewith. Thus, the light assembly internal casing 32 extends between the casing inspection end portion 22 and the shaft connecting end portion 24. Indeed, the light assembly internal casing 32 defines an internal casing centerline 33, which is aligned with the inspection casing centerline 21. The light assembly internal casing 32 defines an internal chamber 31 configured to contain other components of the lighting assembly 30. The light assembly internal casing 32 comprises, amongst others, a peripheral wall spaced-apart from the sidewall 27 and delimitating partially the internal chamber 31.

The lighting assembly 30 further includes a power supply 34 contained within the internal chamber 31 of the light assembly internal casing 32. In some implementations, the power supply 34 includes a rechargeable battery module, and more specifically, a rechargeable battery module including one or more lithium batteries.

Still referring to the non-limitative embodiment shown in FIGS. 4 to 6, the lighting assembly 30 further includes a light-emitting device which comprises a peripheral light-emitting device 36 and a forward light-emitting device 38. The peripheral light-emitting device 36 is mounted to and superposed to the external surface 35 of the peripheral wall of the light assembly internal casing 32. The light-emitting device 36 is configured to emit light according to 360 degrees lighting pattern about the centerlines 21, 33. In the non-limitative embodiment shown, the light-emitting device 36 includes two lighting strips 37a, 37b, spaced apart from one another along the axes of the centerlines 21, 33. Each one of the lighting strips 37a, 37b is operatively connected to the power supply or rechargeable battery module 34.

Each one of the lighting strips 37a, 37b includes a plurality of spaced apart lighting elements 39, which are superposed to the external surface 35 of the peripheral wall of the light assembly internal casing 32. In some implementations, the spaced apart lighting strips 37a, 37b are made of a flexible material and include LEDs as the lighting elements 39. It is noted that such conventional flexible LED strips are already know in the art. Each one of the lighting strips 37a, 37b extends peripherally about the peripheral wall of the light assembly internal casing 32. More particularly, the lighting strips 37a, 37b extend along the entire periphery of the peripheral wall of the light assembly internal casing 32 so as to emit light according to 360 degrees relatively to the inspection casing 22 and the internal casing centerlines 21, 33 as mentioned above. Thus, the lighting strips 37a, 37b are adapted to direct at least some of the light emitted in a direction radially away from, or normal to, the inspection casing centerline 21, namely in a direction away from the sidewall 27.

It is noted that a person skilled in the art to which the visual inspection apparatus 10 pertains would understand that one or more strip(s) can be used to encircle the entire periphery of the light assembly internal casing 32. Alternatively, one or more spaced apart strips 37a, 37b, etc. can be used to illuminate the environment external to the inspection device. In some implementations, independent lighting elements or LEDs can also be randomly superposed to the external surface 35 of the light assembly internal casing 32, as long as it provides an illumination towards the substantially dark environment (the pipe for example) and according to a 360-degree relatively to the inspection casing 22 or internal casing centerlines 21, 33. In some implementations, a plurality of LED arrays or COB LEDs mounted vertically around the perimeter can be used to provide the 360-degree illumination.

As shown in the non-limitative embodiment of FIGS. 1 to 5, the sidewall 27 of the inspection casing 20 can be made of a transparent, translucid or semitransparent material which allows passage of the light therethrough, as mentioned above, while providing a physic barrier against environment external to the inspection casing 20 so as to protect the lighting elements 39 from objects or debris found around the apparatus 10. Therefore, in some implementations, the sidewall 27 can even be made of a meshed material, which is still light permeable.

Still referring to the non-limitative embodiment shown in FIG. 6 wherein the casing inspection end portion 22 and the sidewall 27 have been detached and removed, the light-emitting device of the lighting assembly 30 further includes the forward light-emitting device 38 which is mounted to a forwardly-located surface 44 provided at the central section 26, adjacent to the engagement with the casing inspection end portion 22. In the non-limitative embodiment shown, the forward light-emitting device 38 includes three spaced apart lighting strips 40a, 40b, 40c, each including a plurality of spaced apart lighting elements 42, which are superposed to the forwardly-located surface 44. In the non-limitative embodiment shown, the forwardly-located surface 44 is an internal surface of the inspection casing 20, i.e. it is not an outwardly exposed surface, and the forward light-emitting device 38 are covered and protected by the casing inspection end portion 22 when it engaged with the central section 26. Thus, in the embodiment shown, at least a portion of the casing inspection end portion 22 is light-permeable to allow to allow light to pass therethrough partially or diffusely. In the non-limitative embodiment shown, the casing inspection end wall 22a and the sidewall of the casing inspection end portion 22 are both light-permeable. Therefore, light can be emitted forwardly and peripherally with respect to the centralaxes 21, 33.

However, it is appreciated that, in an alternative embodiment (not shown), the forwardly-located surface 44 can be an external surface of the inspection casing 20 wherein the lighting elements 42 are uncovered and exposed. For instance, the forward light-emitting device 38 can be mounted to the casing inspection end wall 22a of the casing inspection end portion 22. In such embodiment, the casing inspection end wall 22a can be made of less light-permeable material.

In some implementations, the spaced apart lighting strips 40a, 40b, 40c include LEDs as the lighting elements 42. As mentioned above, it is noted that such conventional LED strips are already known in the art. The spaced apart lighting strips 40a, 40b, 40c are mounted to the casing inspection end portion 22 to cover at least a section of the forwardly-located surface 44 so as to emit light forwardly and away of the casing inspection end wall 22a. Each one of the lighting strips 40a, 40b, 40c is operatively connected to the power supply or rechargeable battery module 34. It is noted that a person skilled in the art to which the visual inspection apparatus 10 pertains would understand that one or more lighting strip(s) can be used to illuminate the external environment. In some implementations, independent lighting elements or LEDs can also be randomly superposed to the forwardly-located surface 44 of the inspection casing 20, as long as it provides an illumination forwardly towards the substantially dark environment and in some implementations, perpendicularly to the casing inspection end wall 22a, to complete and enhance the illumination obtained through the peripheral light-emitting device 36.

It is noted that a person skilled in the art to which the visual inspection apparatus 10 pertains would understand that the parts or components mentioned above can be provided as separate components and assembled together, or alternatively, only at least two of the parts or components forming the visual inspection apparatus 10 can be integrally formed.

In some implementations, the lighting assembly 30 can be used without involving the omnidirectional video camera 28. In some implementations, an inspection apparatus can be provided with the lighting assembly 30 only so as to illuminate the external environment. The inspection casing comprising the lighting assembly can be releasably secured to any object or surface (i.e., a stake, a tripod, a support such as the one shown in FIG. 19, etc.).

Figure 2:
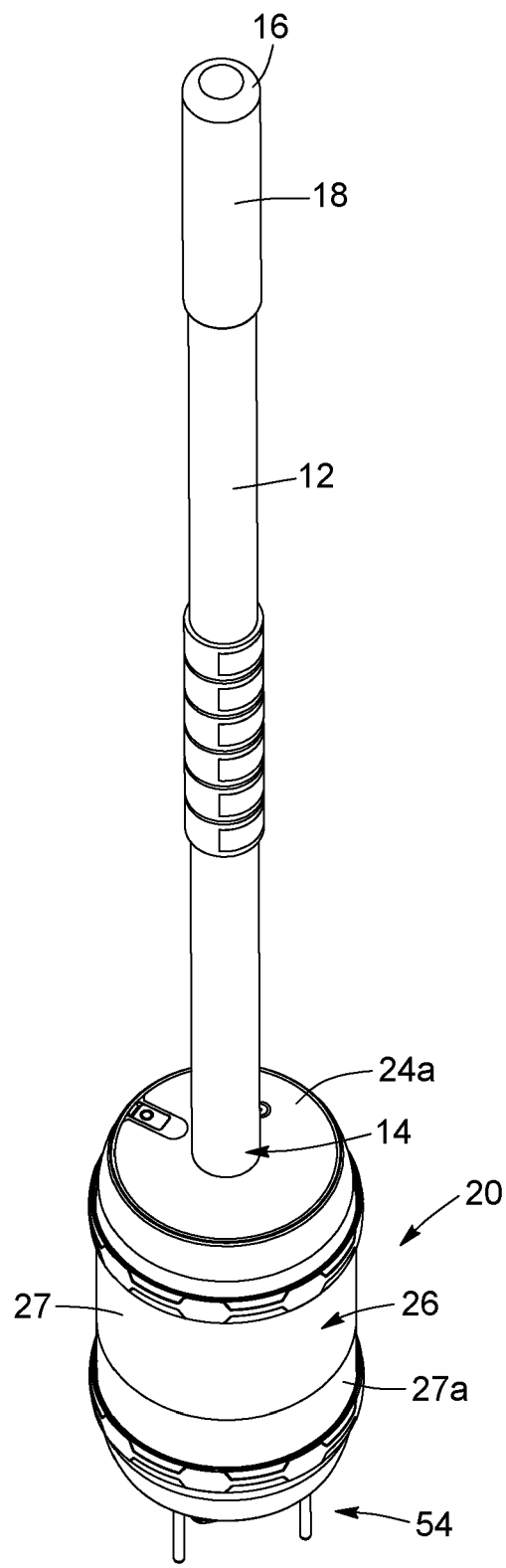
FIG. 2 is top perspective view of the inspection apparatus of FIG. 1.
Figure 3:
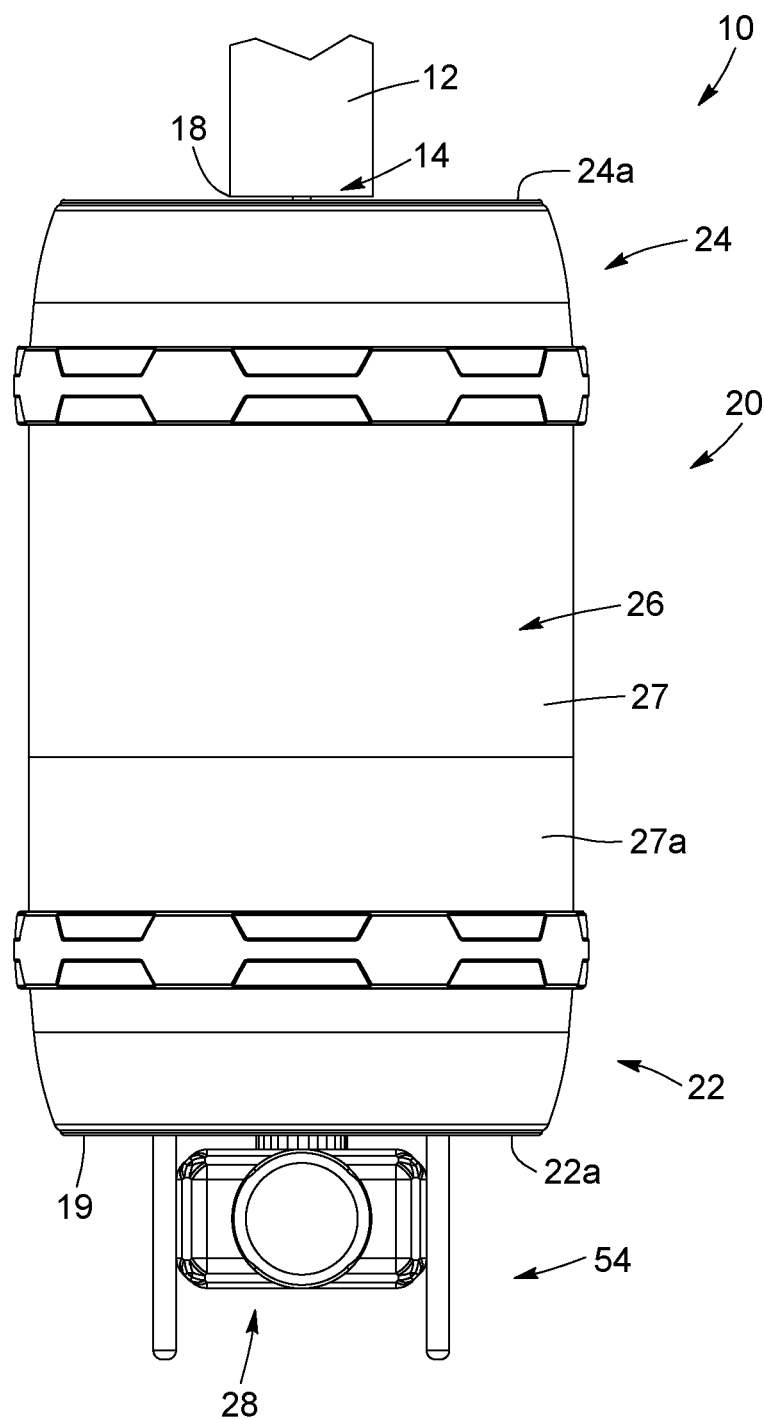
FIG. 3 is a side elevation view, enlarged of an inspection casing of the inspection apparatus shown in FIG. 1.
Figure 7:
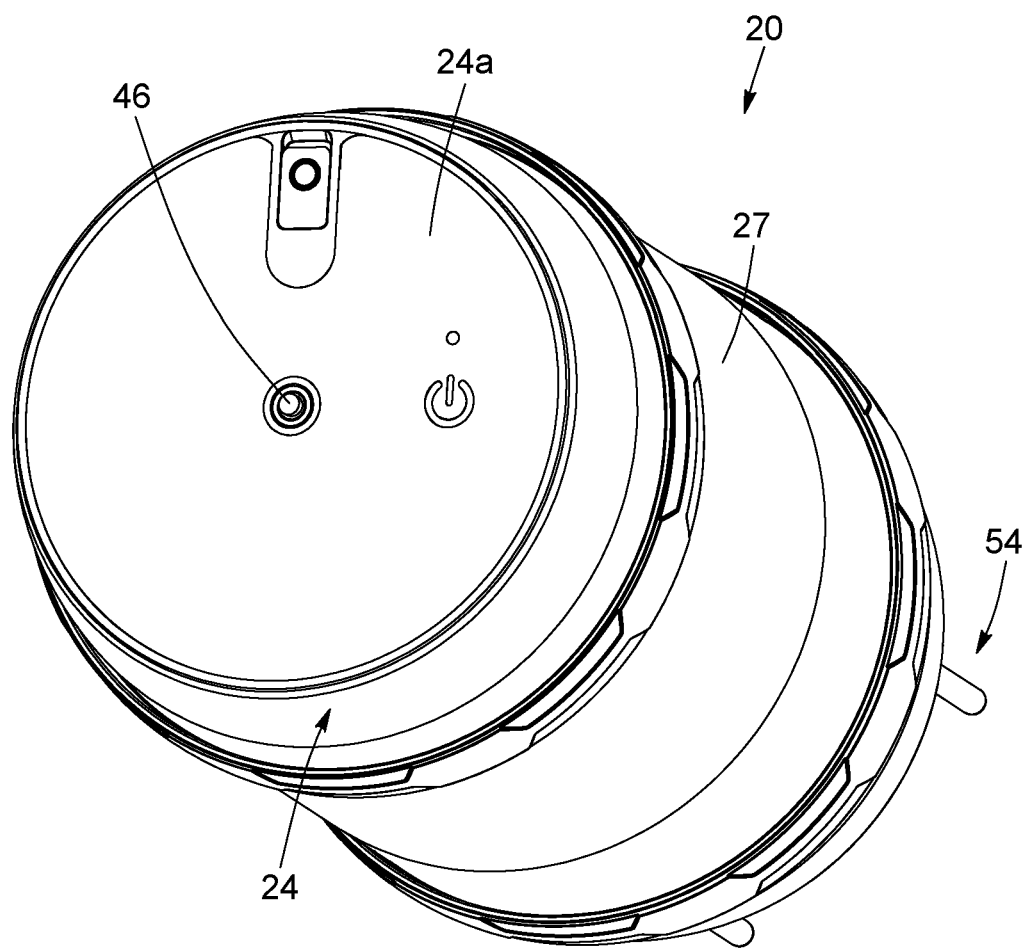
FIG. 7 is a top perspective view of the inspection casing of the inspection apparatus of FIG. 1, wherein a manipulation shaft has been detached and removed.
Figure 8:
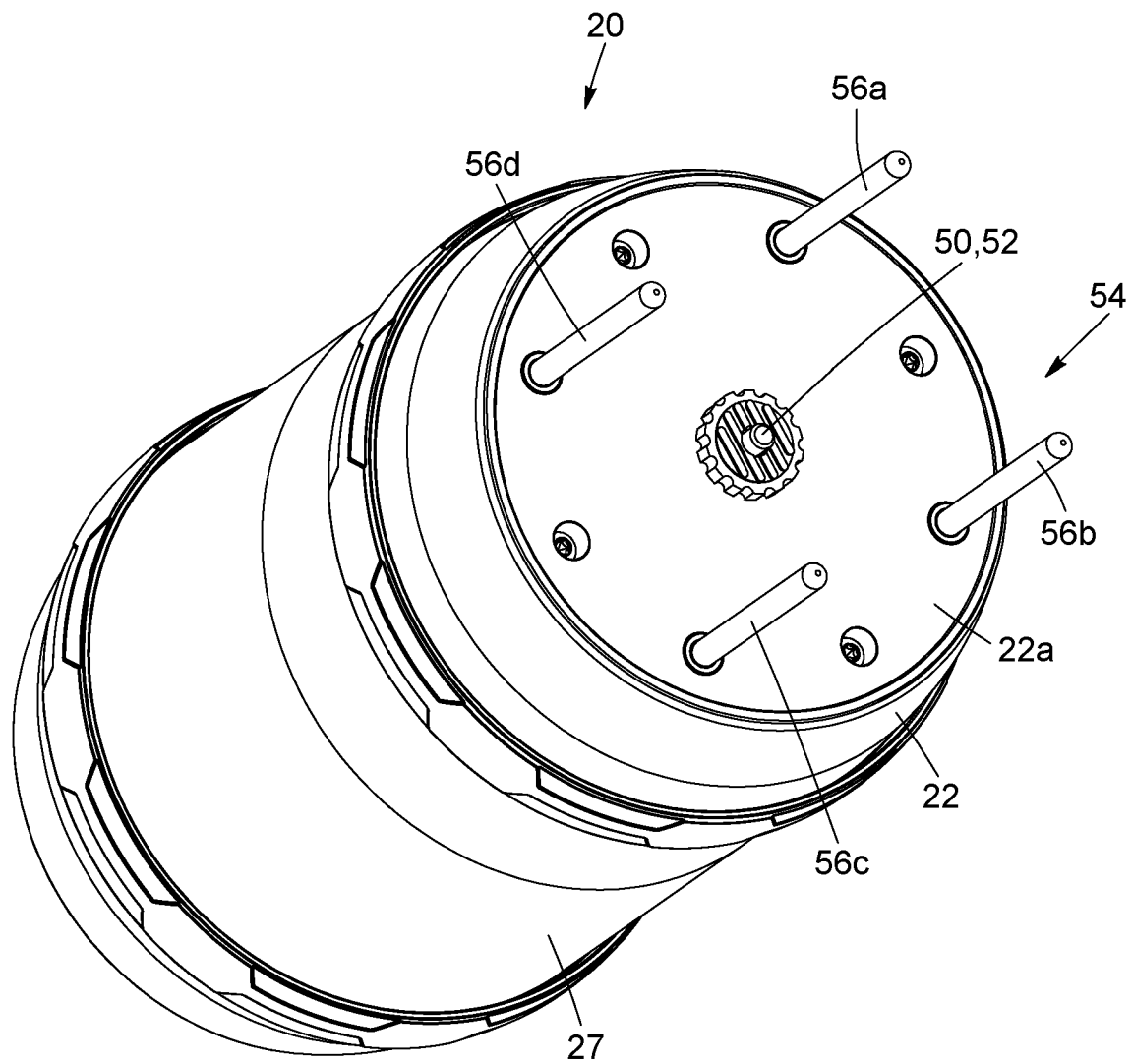
FIG. 8 is a bottom perspective view of the inspection casing shown in FIG. 7, with an omnidirectional video camera being detached and removed therefrom.
Figure 9:
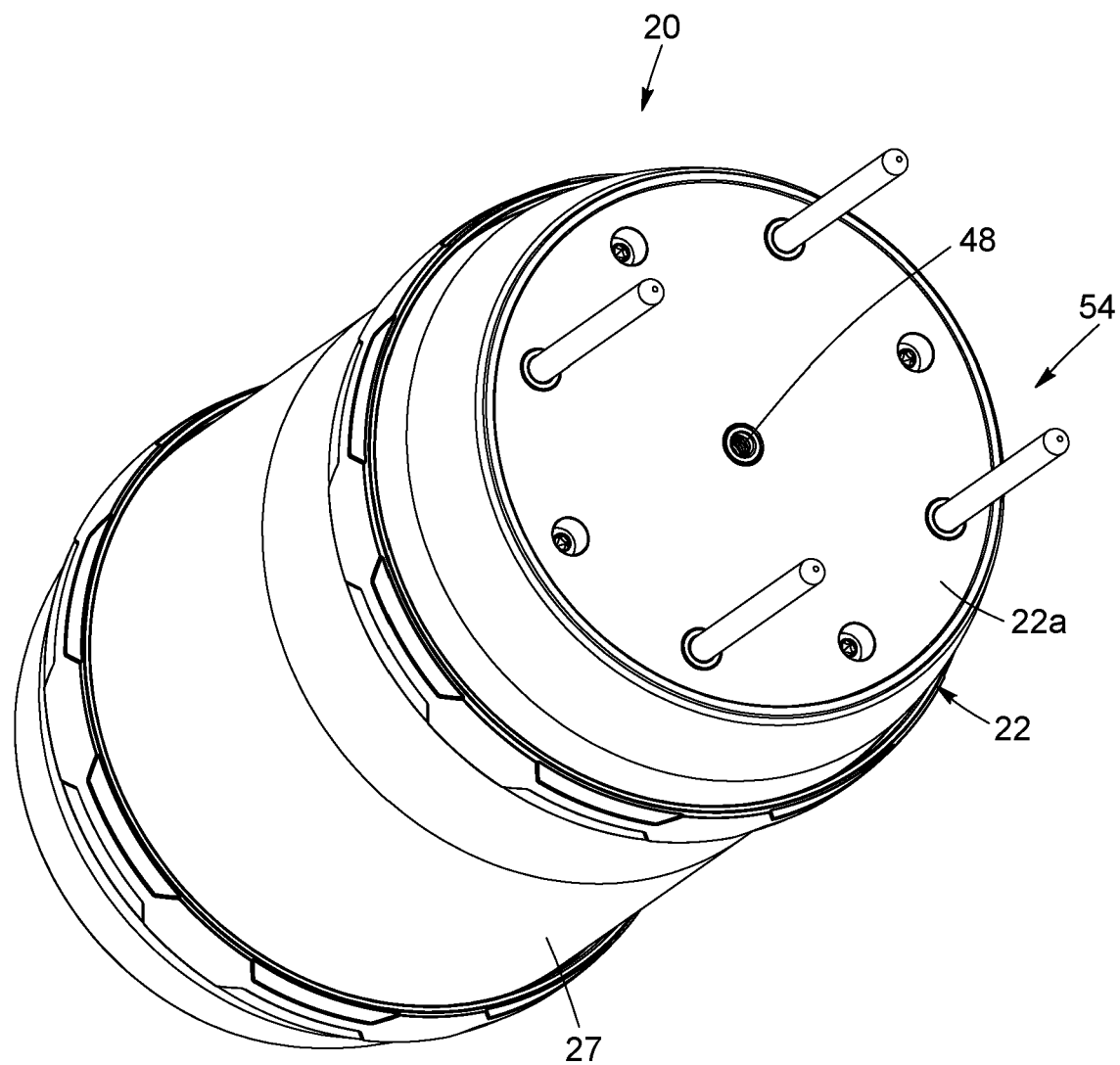
FIG. 9 is another bottom perspective view of the inspection casing shown in FIG. 7, with the omnidirectional video camera and a universal threaded adapter being detached and removed therefrom.

Still referring to the non-limitative embodiment shown in FIGS. 1, 2, and 7, and as mentioned above, the casing mounting end 14 of the elongated shaft 12 is releasably securable to the shaft connecting end portion 24 of the inspection casing 20. Indeed, the casing mounting end 14 of the elongated shaft 12 has a threaded peripheral surface (not shown) which is configured to engage a corresponding internally threaded channel 46 formed through the shaft connecting end portion 24 of the inspection casing 20 and in some implementations, in alignment with the inspection casing centerline 21. In some implementations, the elongated shaft 12 can be pivotally mounted to the shaft connecting end portion 24 and pivotable relatively to the inspection casing centerline 21.

Still referring to the non-limitative embodiment shown in FIGS. 1, 2, 8, and 9 and as mentioned above, the omnidirectional video camera 28 is releasably securable to the casing inspection end portion 22 of the inspection casing 20. Indeed, a threaded area 48 is formed through the casing inspection end portion 22 of the inspection casing 20, in some implementations, in alignment with the inspection casing centerline 21, and a mechanical fastener or connector 50 defining a threaded surface 52 is insertable therein so as to secure the omnidirectional video camera 28 which includes a corresponding threaded area (not shown), as conventionally manufactured. In some implementations, the omnidirectional video camera 28 can even pivot relatively to the inspection casing centerline 21.

Still referring to the non-limitative embodiment shown in FIGS. 1 to 6 and 9 to 11, the visual inspection apparatus 10 further includes a camera protection assembly 54 extending from the casing inspection end portion 22 of the inspection casing 20. In the non-limitative embodiment shown, the camera protection assembly 54 extends forwardly from the casing inspection end wall 22a. The camera protection assembly 54 is configured to provide a protection surrounding the omnidirectional video camera 28 for preventing objects or debris to interface therewith when the inspection casing 20 is lowered in the pipe or cavity for example or alternatively, provided in the environment to be inspected or filmed. As best illustrated in FIGS. 1, 3 to 5, 8 and 9, the protection assembly 54 includes four spaced apart post guards 56a, 56b, 56c, 56d extending forwardly of the casing inspection end portion 22 and located peripherally of the omnidirectional video camera 28 without impeding the 360-degree field of view of the camera 28. In a non-limitative embodiment, the post guards 56a, 56b, 56c, 56d are releasably secured to the casing inspection end portion 22. A person skilled in the art would understand that the protection assembly 54 can take any shape, size and/or configuration, as long as it helps in protecting the omnidirectional video camera 28 from the external environment without obstructing the 360-degree field of view of the camera 28. In the embodiment shown, each one of the post guards 56a, 56b, 56c, 56d extends forwardly of a front end of the camera 28, i.e. their front end, which is a free end in the non-limitative embodiment shown, is located forwadly of the front end of the camera 28. In the non-limitative embodiment shown, the protection assembly 54 includes four spaced apart post guards 56a, 56b non-limitative, 56c, 56d. However, it is an alternative embodiment (not shown), the protection assembly 54 can include only one or more than one post guards with a section thereof extending forwardly of the front end of the camera 28.

Still referring to the non-limitative embodiment shown in FIGS. 4 and 5, it is noted that the shaft connecting end portion 24 is releasably securable to the light assembly internal casing 32 using suitable mechanical fasteners 58a, 58b insertable in threaded apertures provided therein. Furthermore, the casing inspection end portion 22 is similarly releasably securable to the light assembly internal casing 32 using suitable mechanical fasteners 60a, 60b insertable in threaded apertures provided therein. Such configuration of the inspection casing 20 allows a user to, for example, access the battery module 34 and/or provide maintenance to the lighting assembly 30 in general (LEDs replacement, etc.).

In the non-limitative embodiment shown and referring to FIG. 4, the central section 26 of the inspection casing 20 comprises connecting rings 68 at both ends. Each one of the connecting rings 68 comprises two annular receiving channels 62a, 62b, 64a, 64b, one on each side. Free edges of the sidewall of the central section 26 are inserted in two of the annular receiving channels 62a, 62b (one on each one of the connecting rings 68) and the peripheral free edges of the shaft connecting end portion and casing inspection end portion 24, 22 are inserted in the two others annular receiving channels 64a, 64b, when the inspection casing 20 is assembled.

As mentioned above, it is appreciated that the components and thereby the assembly of the inspection casing 20 can vary from the embodiment shown. For instance and without being limitative, the inspection casing 20 could be free of the connecting rings 68 and/or of detachable shaft connecting end portion and casing inspection end portion 24, 22.

It is also noted that the shaft connecting end portion 24 of the inspection casing 20 can receive the other components used in cooperation with the lighting assembly 30, such as, without limitation, an on/off switch button, a LED status indicator, a power supply input (to allow recharge of the battery pack), and the like.

Figure 10:
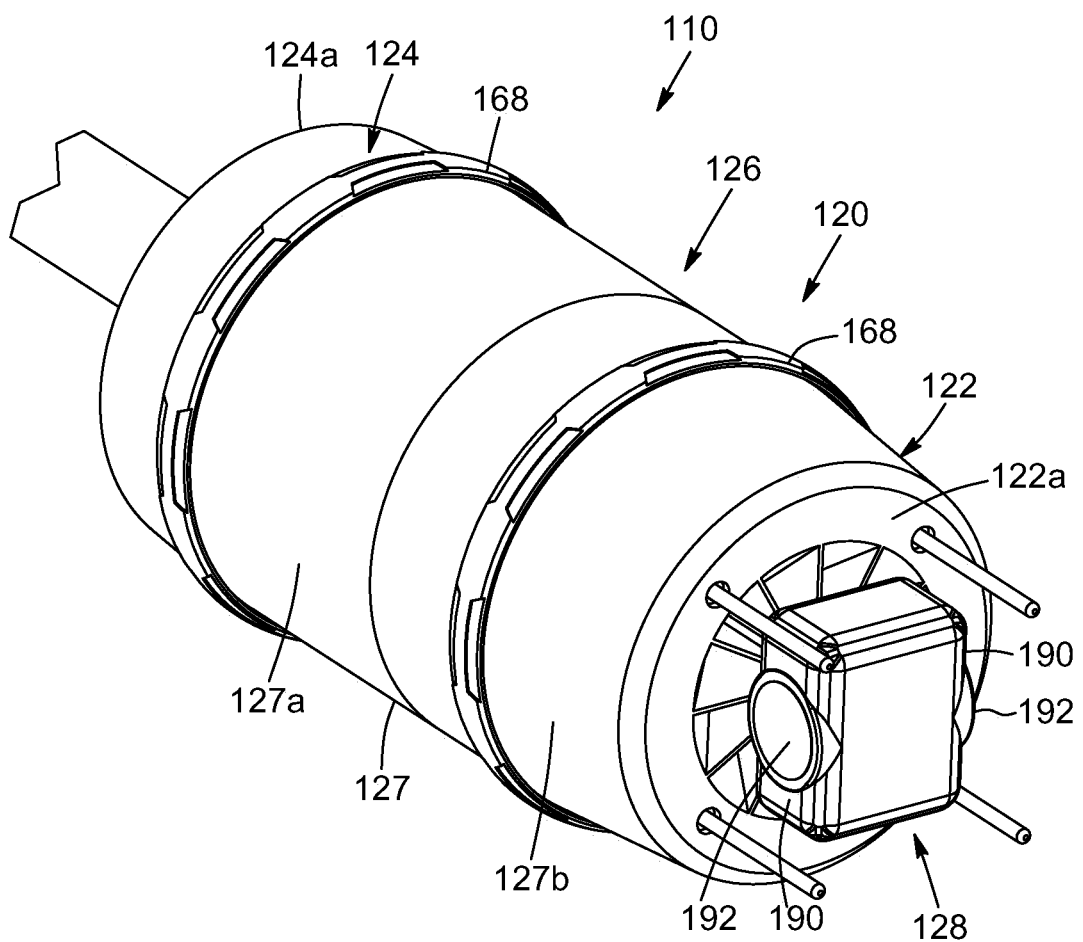
FIG. 10 is a perspective view of an inspection casing of an inspection apparatus in accordance with another embodiment, wherein the inspection apparatus comprises an optical unit.
Figure 11:
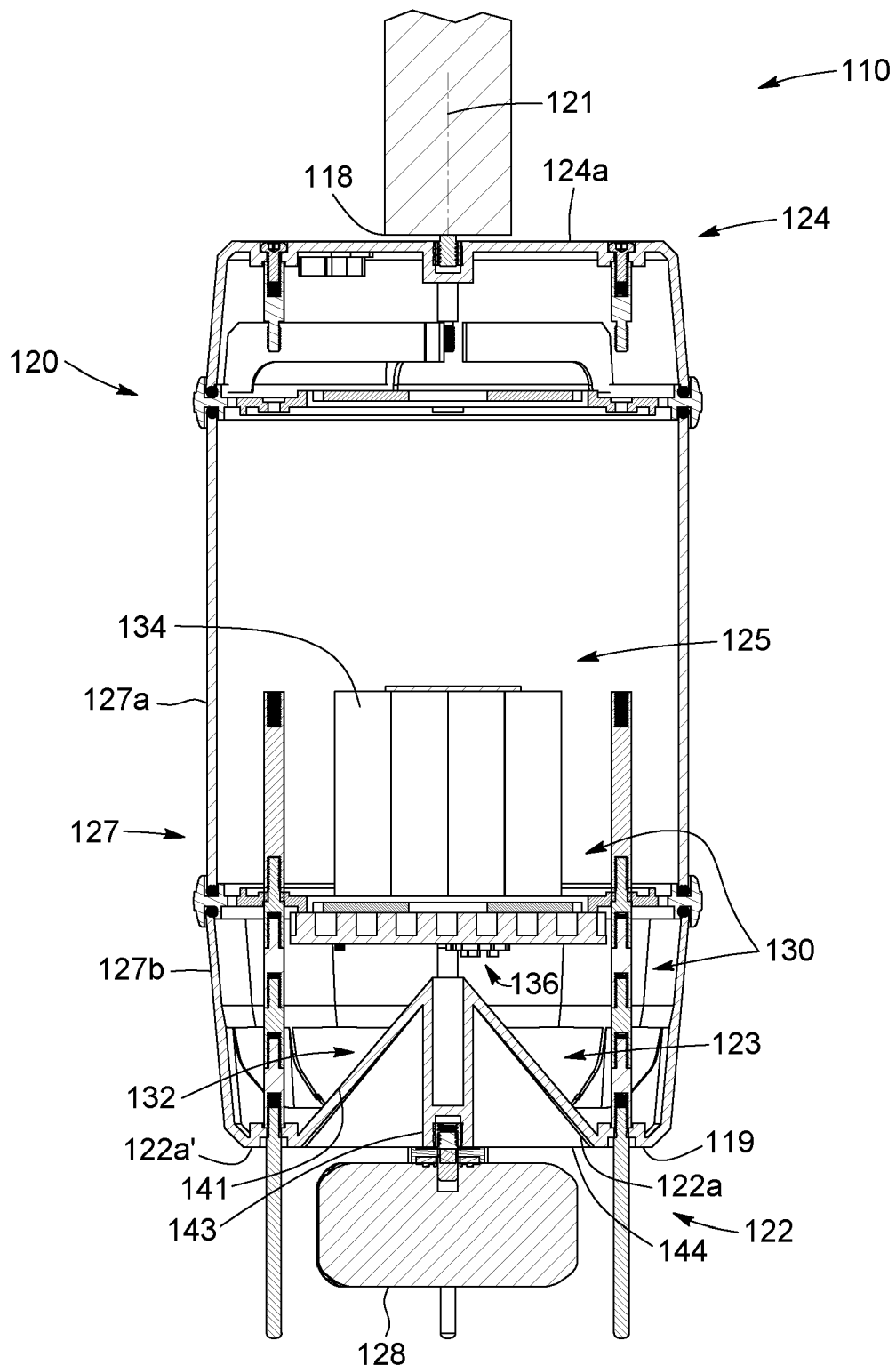
FIG. 11 is a cross-sectional side view of the inspection casing shown in FIG. 10.
Figure 12:
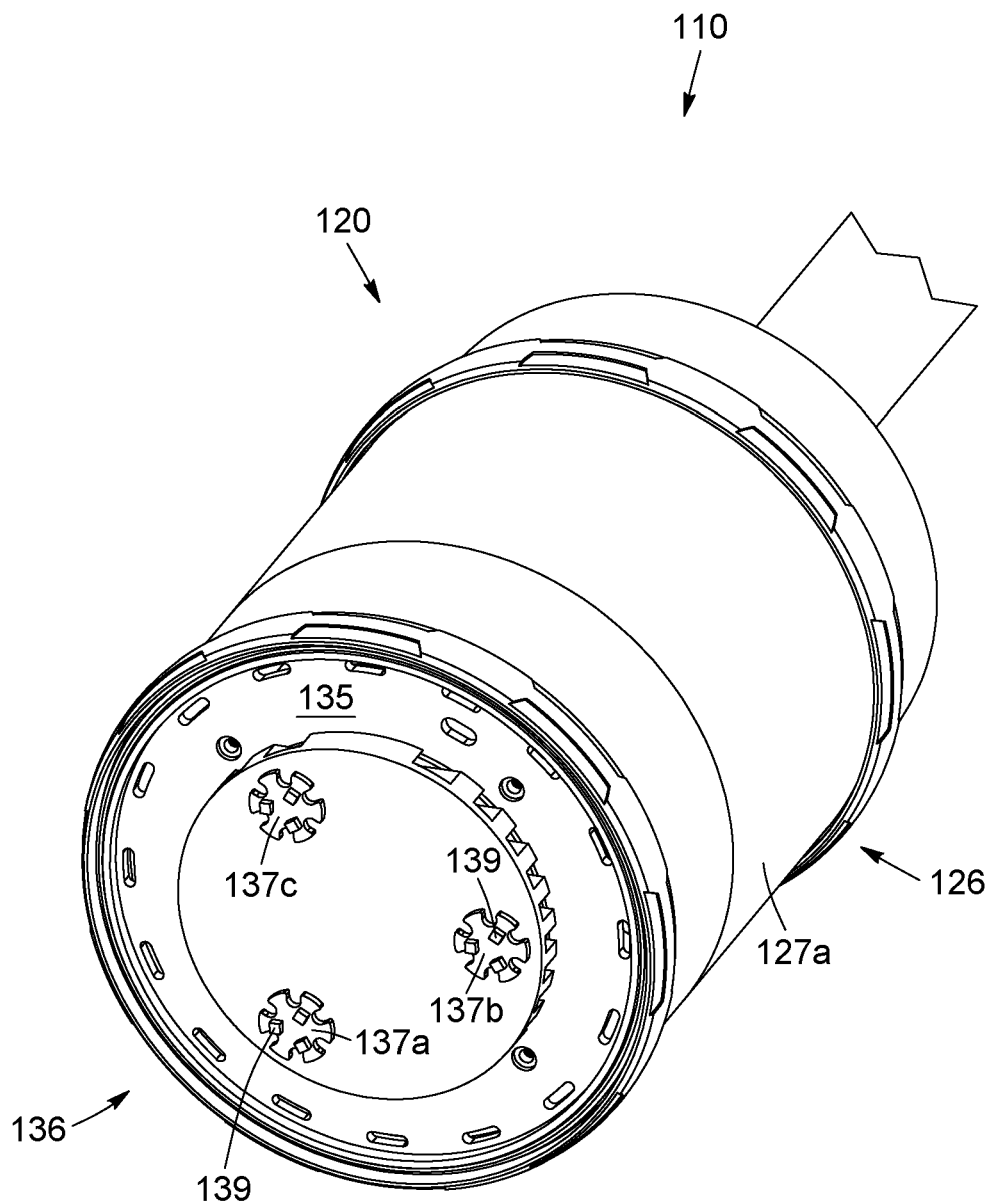
FIG. 12 is a bottom perspective view of the inspection casing shown in FIG. 10, wherein a casing inspection end portion has been detached and remove to expose a light-emitting device of the inspection apparatus.
Figure 13:
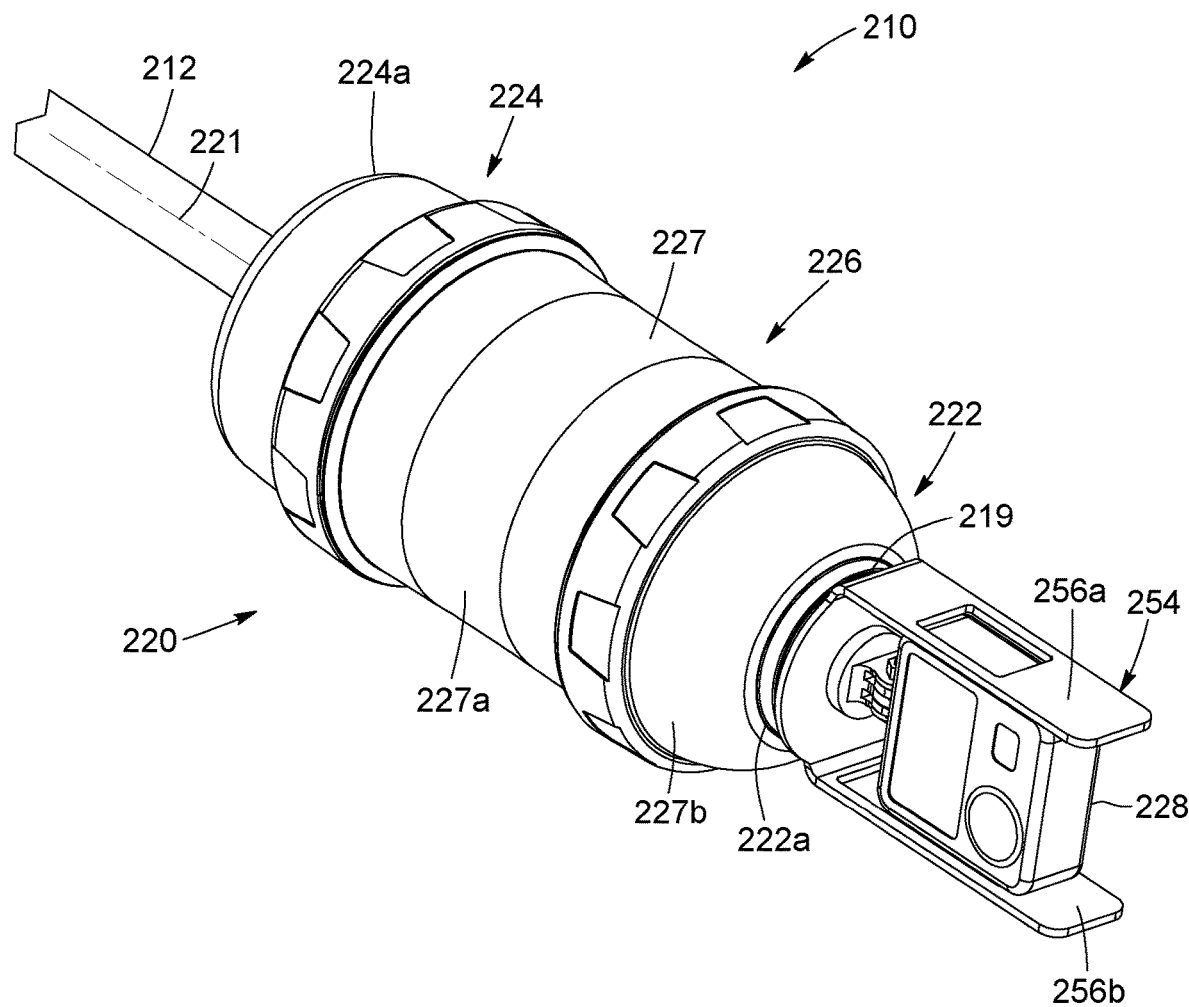
FIG. 13 is a perspective view of an inspection casing of an inspection apparatus in accordance with another embodiment having different lighting and camera protection assemblies.

Referring now to the non-limitative embodiment shown in FIGS. 10 to 12, there is there is shown an alternative embodiment of the visual inspection apparatus wherein the features are numbered with reference numerals in the 100 series which correspond to the reference numerals of the previous embodiment. The inspection apparatus 110 is also configured for visually inspecting a substantially dark area, cavity, channel, conduit or environment (not shown). Several features of this embodiment of the visual inspection apparatus 110 are similar to the ones described above in reference to FIGS. 1 to 9 and will not be described hereinbelow.

According to this other embodiment, the inspection apparatus 110 includes an inspection casing 120 which defines an inspection casing centerline 121, a casing inspection end wall 122a, a shaft connecting end wall 124a as well as a sidewall 127 extending between the casing inspection end 119 and the shaft connecting wall 124a (or a connecting end 118). Once again, the inspection casing 120 is defined by a central section 126 with a shaft connecting end portion 124 and a casing inspection end portion 122 detachably mounted to the central section 126 at a respective end thereof through two connecting rings 168. As shown, the sidewall 127 is not light-permeable along its entire length and can be divided into a sidewall section 127a and a light-permeable sidewall section 127b. In the embodiment shown, the light-permeable sidewall section 127b comprises the sidewall of the casing inspection end portion 122. As shown in FIG. 11, the inspection casing 120 includes a light-emitting compartment 123 delimitated at least partially by the casing inspection end portion 122, and a power supply receiving compartment 124, delimitated at least partially by the sidewall of the central section 126. Thus, in the embodiment shown, the light-emitting compartment 123 is located forwardly of the power supply receiving compartment 125. A power supply 134 is at least partially received and contained in the power supply receiving compartment 125 of the inspection casing 120.

As shown in the non-limitative embodiment of FIGS. 10 to 12, at least a section of the sidewall at least partially delimitating the light-emitting compartment 123 can be made of a transparent material so as to allow light to pass therethrough in totality, or alternatively, the sidewall of the sidewall section 127b can be made of a translucid or semitransparent material so as to allow light to pass therethrough partially or diffusely. Alternatively, only a section of the sidewall section 127b can be made of a light-permeable material, such as a transparent, translucid or semitransparent material, as will be described in more details herein. On the other hand, according to the present embodiment, the sidewall section 127a of the sidewall 127 at least partially delimitating the power supply receiving compartment 125 can be made of a material presenting opacity properties, as no light need to pass therethrough.

In the embodiment shown, the casing inspection end wall 122a, which delimits forwardly the light-emitting compartment 123, is also made of a translucid or semitransparent material so as to allow light to pass therethrough partially or diffusely.

Still referring to the non-limitative embodiment shown in FIGS. 10 to 12, the inspection apparatus 110 further includes an omnidirectional video camera 128 (also referred to as 360-degree video camera), as defined above, which is releasably securable to the casing inspection end portion 122 of the inspection casing 120 and, more particularly, it extends forwardly from the casing inspection end wall 122a. In the embodiment shown, the video camera 128 extends forwardly of the casing inspection end 119. As shown in FIG. 10, the video camera 128 includes a housing with sidewalls and two camera lenses 192 outwardly exposed and facing in opposite directions. The two sidewalls 190 having the camera lenses 190 protruding outwardly therefrom extend parallel to one another.

Still referring to the non-limitative embodiment shown in FIGS. 10 to 12, the inspection apparatus 110 further includes a lighting assembly 130 which is configured to illuminate the substantially dark environment during the 360-degree video recording (or alternatively, prior to, or following, the 360-degree video recording). Indeed, the lighting assembly 130 is at least partially contained in the light-emitting compartment 123 and adapted to emit light away from the sidewall section 127b of the sidewall 127, as well as forwardly of and away from the casing inspection end 119 of the inspection casing 120, to illuminate the substantially dark environment, according to 360 degrees relatively to the inspection casing centerline 121, as well as forwardly and away from the casing inspection end 119.

To emit light away from the sidewall section 127b and forwardly and away from the casing inspection end 119, the lighting assembly 130 includes a light-emitting device 136 and a light redirecting module 132 provided within the light-emitting compartment 123. The light-emitting device 136 is operatively connected to the power supply 134 contained in the power supply receiving compartment 125. In some implementations, the power supply 134 includes a rechargeable battery module, and more specifically, a rechargeable battery module having a one or more lithium batterie(s), as defined above for the first embodiment.

Still referring to the non-limitative embodiment shown in FIGS. 10 to 12, the light-emitting device 136 which is superposed to an internal surface 135 of the light-emitting compartment 123, rearwardly located with respect to the casing inspection end wall 122a, which in the non-limitative embodiment shown is a front surface 135 (FIG. 12) of the partion wall extending between the light-emitting compartment 123 and the power supply receiving compartment 125 (or the central section). As best shown in FIG. 12, in this non-limitative embodiment, the light-emitting device 136 includes three spaced apart lighting-emitting devices or stars 137a, 137b, 137c, each one including a plurality of spaced apart lighting elements 139, which are superposed to the rearwardly-located surface 135 of the light-emitting compartment 123. It is noted that in some implementations, each lighting-emitting device or star can include only one lighting element 139. In some implementations, the spaced apart lighting devices or stars 137a, 137b, 137c include LEDs as the lighting elements 139. It is noted that such conventional LED devices or stars are already know in the art.

The light redirecting module 132 further includes an optical unit 141 rearwardly extending inwardly from a marginal peripheral region 122a' of the casing inspection end wall 122a and rearwardly from the casing inspection end 119. In the embodiment shown, the optical unit 141 is located forwardly of the rearwardly-located surface 135 of the light-emitting compartment 123 including the light-emitting devices 136 and with an apex thereof being spaced-apart therefrom. The optical unit 141, which is defined by a portion of the casing inspection end wall 122a, further delimits the light-emitting compartment 123 of the inspection casing 120. The light-emitting device 136 emits light towards the optical unit 141, which, in turn, redirect at least some of the light emitted from the lighting elements or LEDs 139 peripherally, i.e. in the direction of the sidewall section 127b of the sidewall 127.

More particularly, the optical unit 141 includes a substantially conical-shaped peripheral wall extending inwardly from the casing inspection end 119 and, more particularly, from the marginal peripheral region 122a' of the casing inspection end wall 122a. The optical unit 141 is centered about the centerline 121. A camera supporting post 143 extends centrally therein, outwardly of the light-emitting compartment 123 with the camera 128 being detachably mounted to a front end thereof. In the embodiment shown, the camera supporting post 143 also includes a small section extending in the light-emitting compartment 123 and abutting the rearwardly-located surface 135. At its front end, the camera supporting post 143 comprises a threaded aperture engageable by a complementary threaded post to mount the camera 128 to the casing inspection end 119, i.e. the front end of the inspection casing 120.

It is appreciated the shape of the optical unit 141 can differ from the non-limitative embodiment shown in the figures. For instance and without being limitative, the optical unit can have a periperal wall shaped as a truncated hemisphere, i.e. the peripheral walls can have a curvature instead of being straight. Still in an alternative embodiment, the optical unit can have periperal walls defining a truncated pyramid. In the embodiment shown, the peripheral wall(s) of the optical unit converge(s) towards the partition wall 135. However, in an alternative embodiment (not shown), the peripheral wall(s) of the optical unit can converge towards the casing inspection end 119.

In the non-limitative embodiment shown, the optical unit 141, defined by a portion of the casing inspection end wall 122a, is made of a light-permeable material, such as the ones described above for other light-permeable components.

Once again, the light-permeable section of the inspection casing 120 extends at least along 360 degrees obtained by the combination of the peripheral light-permeable section 127b and the section of the casing inspection end wall 122a which is also light permeable.

In the non-limitative embodiment shown, the oblique walls of the optical unit 141 define an angle ranging between about 30 degrees and 60 degrees with the rearwardly-located surface 135.

The spaced apart lighting devices 137a, 137b, 137c and the optical unit 141 are configured so as to emit light according to 360 degrees pattern relatively to the inspection casing centerline 121 and forwardly of the inspection casing 120, away from the casing inspection end 119. Each one of the lighting-emitting devices 137a, 137b, 137c is operatively connected to the power supply or rechargeable battery module 134 and is adapted to direct at least some of the light emitted in a direction radially away from, or normal to, and/or at an oblique angle with respect to the inspection casing centerline 121. It is noted that a person skilled in the art to which the inspection apparatus 110 pertains would understand that one or more spaced apart lighting devices can be used to illuminate the substantially dark environment. In some implementations, independent lighting elements or LEDs can also be randomly superposed to the upper surface 135 of the light source receiving portion 122, as long as it provides an illumination towards the interior of the piping and according to a 360-degree relatively to the inspection casing centerline 121 and forwardly of the inspection casing 120.

In some implementations, the optical unit 141 can be a distinct component from the casing inspection end wall 122a. It can still be a light-reflector and/or light-diffractor such as and without being limitative the conically-shaped optical unit shown in FIGS. 10 to 12. It can extends rearwardly with respect to the casing inspection end 119 but be covered and protected by a casing inspection end wall extending at the casing inspection end 119. In some implementations, the casing inspection end 119 is also light-permeable.

In some implementations, the lighting assembly 130 of the inspection apparatus 110 can further include the forward light-emitting device as defined above which is superposed to a forwardly-located surface 144 provided at the casing inspection end 119 to provide an illumination forwardly towards the substantially dark environment to complete and enhance the illumination obtained through the light-emitting devices 136. The forwardly-located surface 144 can be the marginal peripheral region 122a' of the casing inspection end wall 122a or the casing inspection end wall 122a itself if the optical unit 141 is covered and protected by same.

Referring now to the non-limitative embodiment shown in FIGS. 13 to 18, there is there is shown an alternative embodiment of the visual inspection apparatus wherein the features are numbered with reference numerals in the 200 series which correspond to the reference numerals of the previous embodiments. The visual inspection apparatus 210 is also configured for visually inspecting a substantially dark area, cavity, channel, conduit or environment (not shown). Several features of this embodiment of the visual inspection apparatuses 210 are similar to the ones described above in reference to FIGS. 1 to 12 and will not be described hereinbelow.

The visual inspection apparatus 210 comprises an elongated manipulation shaft 212, having a casing connecting end 214 detachably mounted to an inspection casing 220. The inspection casing 220 is similar to the ones described above in reference to FIGS. 1 to 12 and can be divided into a casing inspection end portion 222 (including a casing inspection end wall 222a), a shaft connecting end portion 224 (including a casing connecting end wall 224a) as well as a central portion 226 joining the casing inspection end portion 222 and the shaft connecting end portion 224. Thus, the inspection casing 220 comprises a sidewall 227 extending between the casing inspection end wall 222a and the casing connecting end wall 224a. End sections of the sidewall 227 are part of the casing and shaft connecting end wall 222, 224 while the central section of the sidewall 227 is part of the central section 226. In the embodiment shown, the casing inspection end portion 222 and the shaft connecting end portion 224 are detachably mounted to the central portion 226. Once again, it is appreciated that the components of the inspection casing 220 can vary from the embodiment shown.

The sidewall and the casing inspection end wall 222a of the casing inspection end portion 222 is made of a light-permeable material, such as the ones described above for other light-permeable components. The sidewall in the central portion 226 and the shaft connecting end portion 224 can be made of a material presenting opacity properties, as no light need to pass therethrough. Thus, as for the above-described embodiment shown in FIGS. 10 to 12, the sidewall 227 is not light-permeable along its entire length and can be divided into a sidewall section 227a and a light-permeable sidewall section 227b. In the embodiment shown, the light-permeable sidewall section 127b comprises the sidewall of the casing inspection end portion 122. Thus, the light-permeable section of the inspection casing 220 extends at least along 360 degrees obtained by the combination of the peripheral light-permeable section 227b and the section of the casing inspection end wall 222a which is also light permeable.

The shaft connecting end portion 224 and the casing inspection end portion 222 are detachably mounted to the central section 226. However, as shown in FIG. 14, they are directly screwed to a respective end thereof with complementary threads provided on the outer surface of central section 226 and on an inner surface of the shaft connecting end portion 224 and the casing inspection end portion 222.

Figure 14:
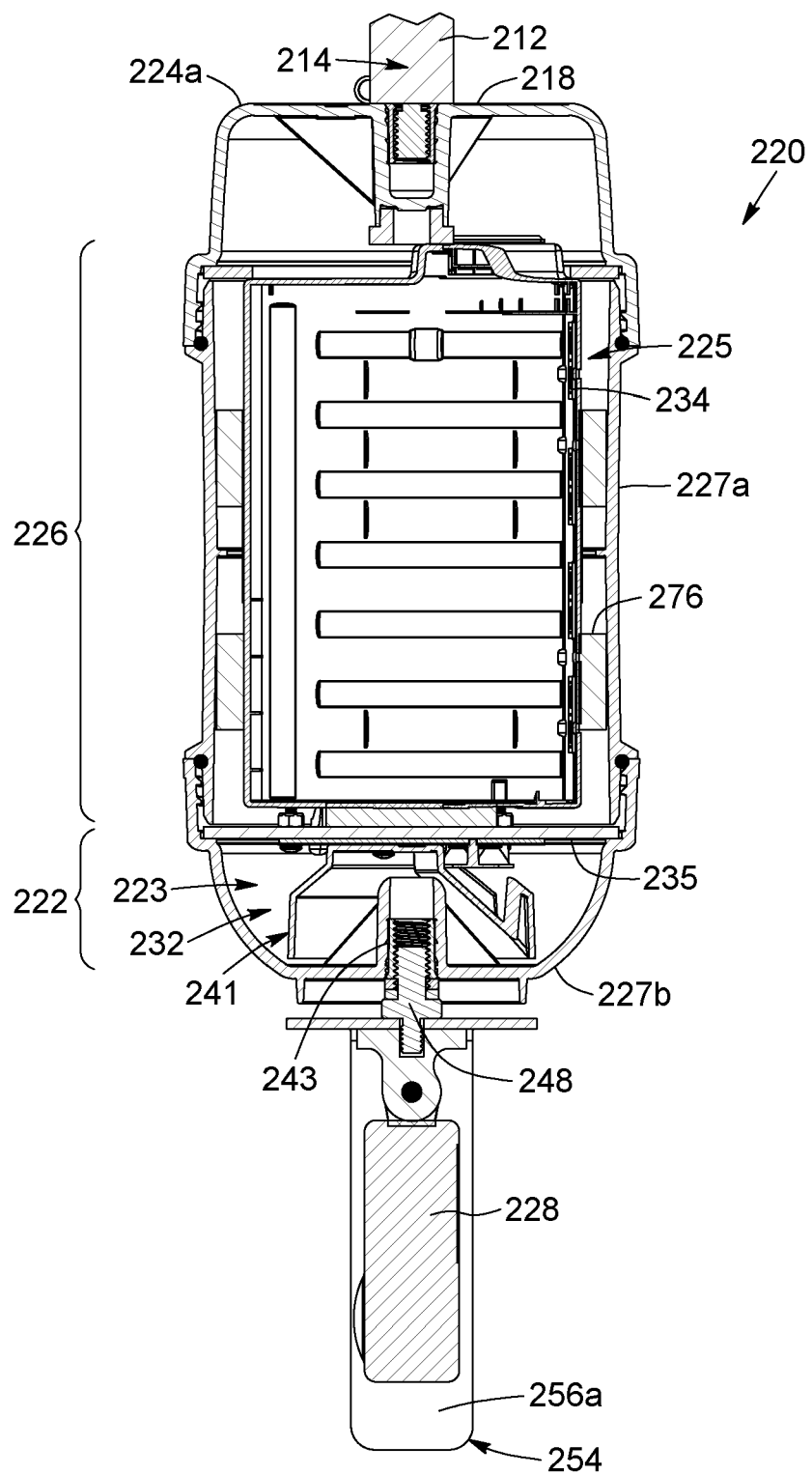
FIG. 14 is a cross-sectional side view of the inspection casing shown in FIG. 13 taken along a first section line.

As shown in FIG. 14, the inspection casing 220 includes a light-emitting compartment 223 delimited at least partially by the casing inspection end portion 222, and a power supply receiving compartment 224, delimited at least partially by the sidewall of the central section 226. Thus, in the embodiment shown, the light-emitting compartment 223 is located forwardly of the power supply receiving compartment 225. A power supply 234 is at least partially received and contained in the power supply receiving compartment 225 of the inspection casing 220, as for the above-described embodiment shown in FIGS. 10 to 12.

Figure 15:
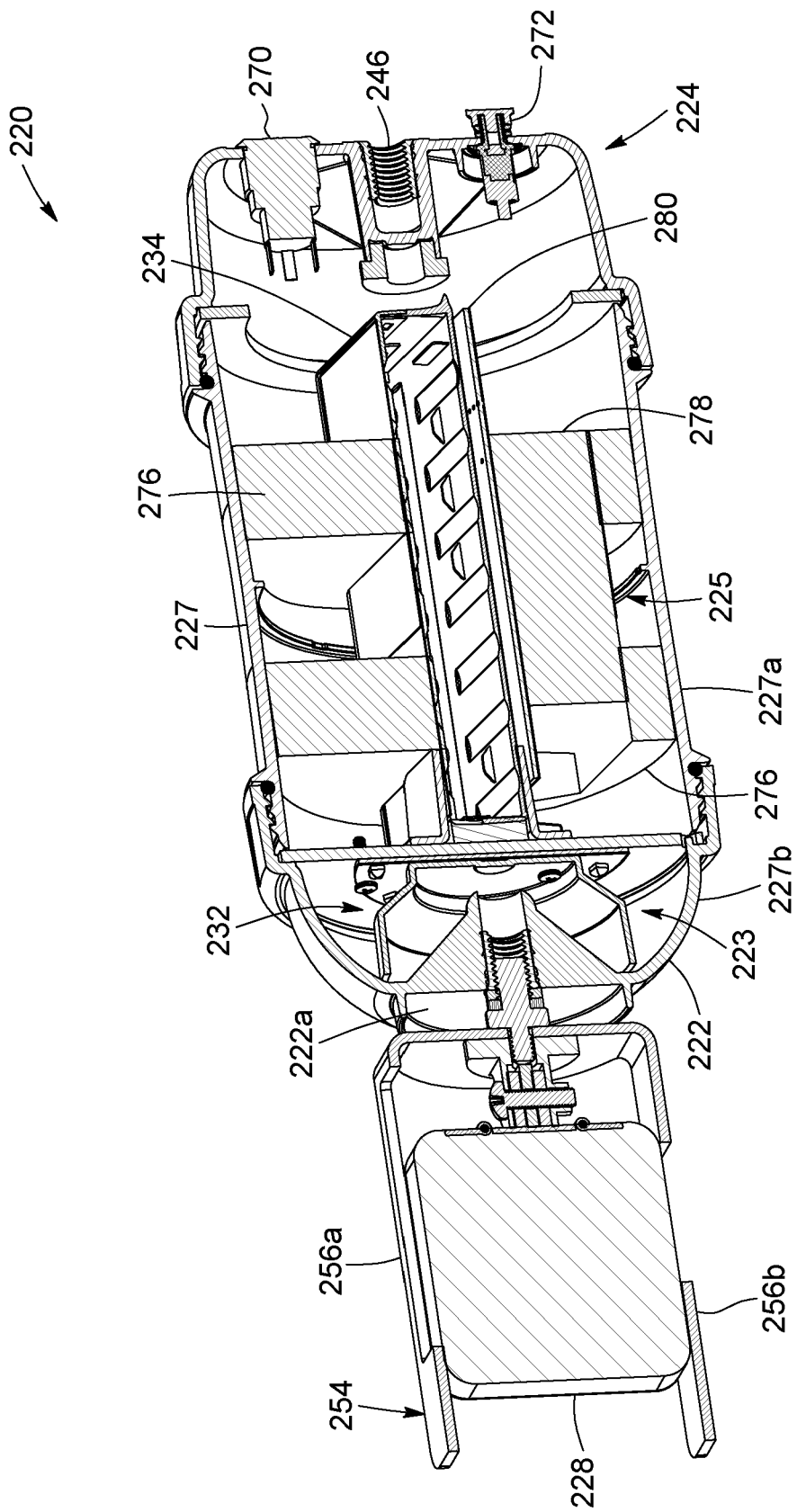
FIG. 15 is another cross-sectional side view of the inspection casing shown in FIG. 13 taken along a second section line, orthogonal to the first section line.

More particularly, referring to FIGS. 14 and 15, the power supply receiving compartment 225 is sealed hermetically and contains, in addition to a battery pack 234, acting as the power supply, a printed circuit 280, a lighting assembly driver module 278, a battery protection assembly 276 surrounding partially the power supply 234, and a heat sink (not shown).

The inspection apparatus 210 further includes an omnidirectional video camera 228, which is similar to the ones described above for the embodiments shown in FIGS. 1 to 12, which is releasably securable to the casing inspection end portion 222 of the inspection casing 220 and, more particularly, it extends forwardly from the casing inspection end wall 222a. In the embodiment shown, the video camera 228 extends forwardly of the casing inspection end 219 and is rotatably mounted thereto. In the embodiment shown, the casing inspection end wall 222a corresponds to the casing inspection end 219 of the inspection casing 220.

The video camera 228 is contained in an inner spacing delimited by a camera protection assembly 254 extending from the casing inspection end portion 222 of the inspection casing 220. In the non-limitative embodiment shown, the camera protection assembly 254 extends forwardly from the casing inspection end wall 222a. The camera protection assembly 254 is configured to provide a protection surrounding the omnidirectional video camera 228 for preventing objects or debris to interface therewith when the inspection casing 220 is lowered in the pipe, the channel or cavity for example or alternatively, provided in the environment to be inspected or filmed. The protection assembly 254 includes two post guards 256a, 256b extending forwardly of the casing inspection end portion 222 and located on each side of the omnidirectional video camera 228. As the video camera 228 is rotatably mounted to the casing inspection end 219 and rotatable about an inspection casing centerline 221, the post guards 256a, 256b does not impede the 360-degree field of view of the camera 228. In the embodiment shown, each one of the post guards 256a, 256b extends forwardly of a front end of the camera 228, i.e. their front end, which is a free end in the non-limitative embodiment shown, is located forwardly of the front end of the camera 228.

The post guards 256a, 256b can be provided with side openings to provide access to the camera's on-off switch, battery, and memory card.

Referring to FIGS. 14 and 15, the inspection apparatus 210 further includes a lighting assembly 230 which is configured to illuminate the substantially dark environment during the 360-degree video recording (or alternatively, prior to, or following, the 360-degree video recording). Indeed, the lighting assembly 230 is at least partially contained in the light-emitting compartment 223 and adapted to emit light away from the sidewall section 227b of the sidewall 227, as well as forwardly of and away from the casing inspection end 219 of the inspection casing 220, to illuminate the substantially dark environment, according to 360 degrees relatively to the inspection casing centerline 221, as well as forwardly and away from the casing inspection end 219.

To emit light away from the sidewall section 227b and forwardly and away from the casing inspection end 219, the lighting assembly 230 includes a light-emitting device 236 and a light redirecting module 232 provided within the light-emitting compartment 223. The light-emitting device 236 is operatively connected to the power supply 234, similar to the ones described above in reference to FIGS. 1 to 12, contained in the power supply receiving compartment 225.

Figure 16:
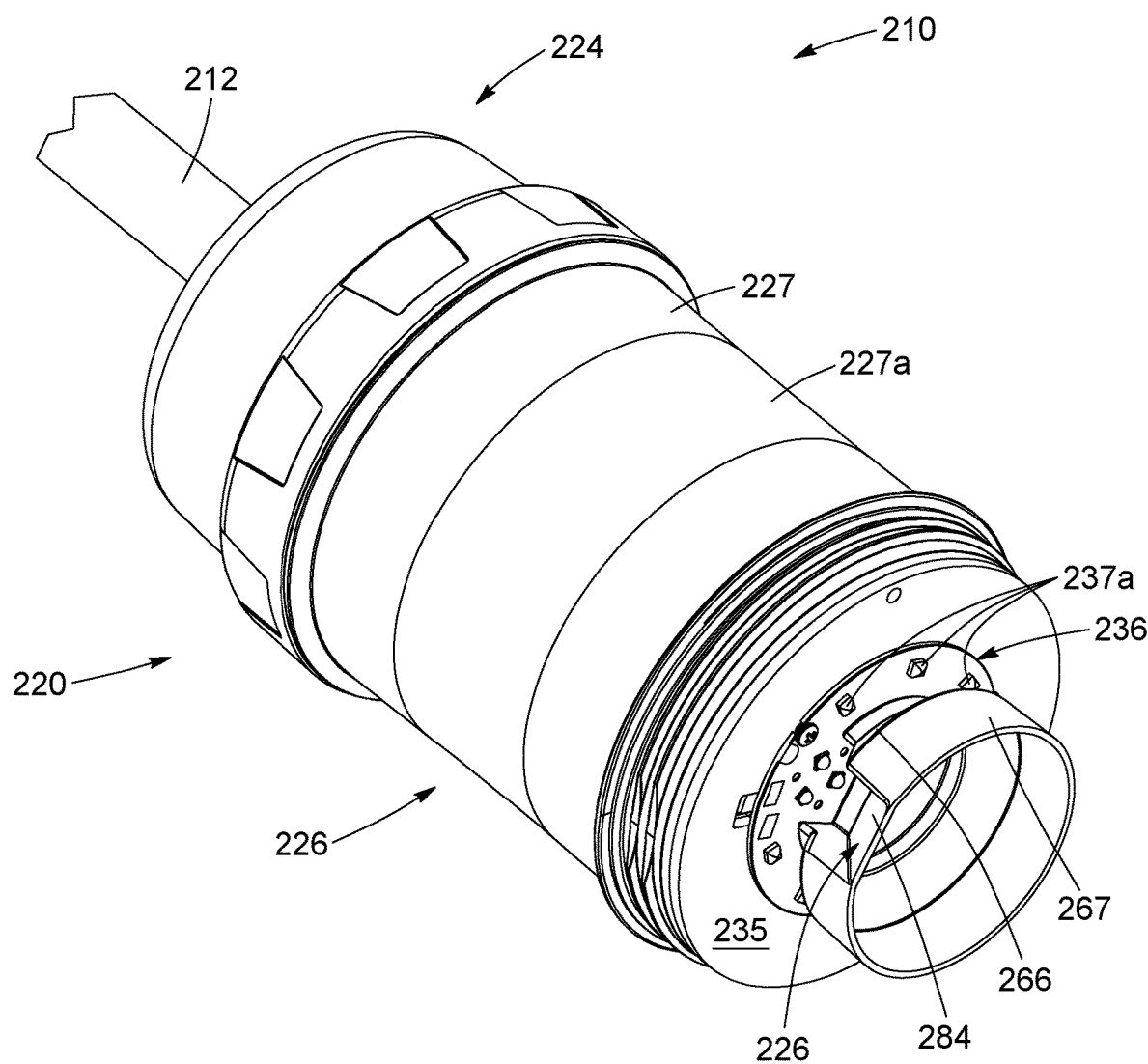
FIG. 16 is a bottom perspective view of the inspection casing shown in FIG. 13, wherein a casing inspection end portion has been detached and remove to expose a light-emitting device and a light redirecting module of the inspection apparatus.
Figure 17:
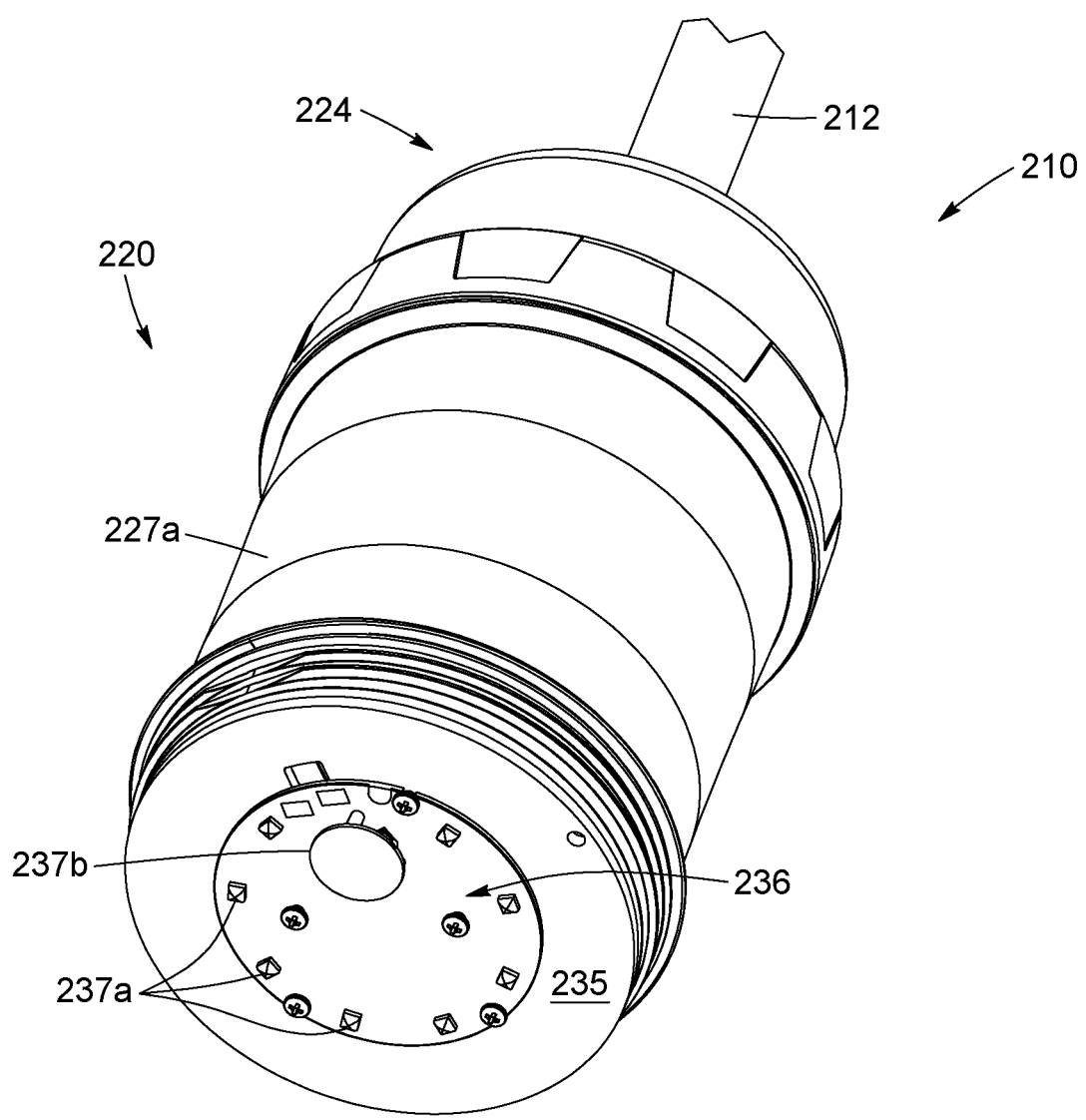
FIG. 17 is a bottom perspective view of the inspection casing shown in FIG. 13, wherein a casing inspection end portion and the light redirecting module have been detached and remove to expose a light-emitting device of the inspection apparatus.

As for the embodiment shown in FIGS. 10 to 12, the light-emitting device 236 is superposed to an internal surface 235 of the light-emitting compartment 223, rearwardly located with respect to the casing inspection end wall 122a, which in the non-limitative embodiment shown is a front surface 135 (FIGS. 16 and 17) of the partion wall extending between the light-emitting compartment 223 and the power supply receiving compartment 225 (or the central section). In a non-limitative embodiment, the partition wall is made of an aluminium alloy. As best shown in FIGS. 16 and 17, in this non-limitative embodiment, the light-emitting device 236 includes a plurality of spaced-apart lighting-emitting devices 237a, 237b, which are superposed to the rearwardly-located surface 235 of the light-emitting compartment 223. More particularly, in this non-limitative embodiment, the light-emitting device 236 includes two types of lighting-emitting devices. It includes a plurality of LED 237a emitting light over 360 degrees and, more particularly, cooler white color with a good Color Rendering Index. It also includes three LED 237b with collimating optics emitting a narrow spot light beam for long distance lighting towards pipe sidewalls. The LEDs 237b are located inwardly of the LEDs 237a, i.e. closer to a center of the surface 235. They are located under a flat mirror of the light redirecting module 232, as will be described in more details below. As mentioned above, it is appreciated that the light-emitting device 236 can vary from the embodiment shown.

The light redirecting module 232 further includes an optical unit 241 extending forwardly from the rearwardly-located surface 235, towards the casing inspection end 219, and centrally inside the light-emitting compartment 223. In this embodiment, the optical unit 241 is a distinct component from the casing inspection end portion 222 including the casing inspection end wall 222a. The light-emitting device 236 emits light towards the optical unit 241, which, in turn, redirect at least some of the light emitted from the lighting elements or LEDs 237a, 237b peripherally, i.e. in the direction of the sidewall section 227b.

More particularly, the optical unit 241 is a substantially outwardly-shaped frusto-conical element extending forwardly from the surface 235, with one or more recesses defined in a peripheral wall thereof, and centered about the centerline 221. A camera supporting post 243 extends centrally therein to receive a camera adapter 248, such as a threaded camera adapter, to detachably mounted the video camera 228 to a front end of the inspection casing 220. The camera supporting post 143 defines an inner channel with a threaded surface engageable by complementary threads provided on an outer surface of the camera adapter 248 to mount the camera 228 to the casing inspection end 219.

As for the optical unit 141, it is appreciated the shape of the optical unit 241 can differ from the non-limitative embodiment shown in the figures. For instance and without being limitative, the optical unit can be shaped as a truncated hemisphere, a truncated pyramid, and the like. The peripheral wall(s) of the optical unit can converge either towards the partition wall 235 or away therefrom, i.e. they can converge towards the casing inspection end 219.

In the non-limitative embodiment shown, the optical unit 241, defined by a portion of the casing inspection end wall 122a, is made of a light-reflective material, such as a metallic-based reflective material, including but without being limited to a chrome-based material or chrome plated surface.

Turning now to FIG. 16, in the non-limitative embodiment shown, the peripheral wall of the optical unit 241 can be divided into two sections: a conical section 266 including oblique walls, i.e. walls defining an angle ranging between about 30 degrees and 60 degrees with the rearwardly-located surface 235, followed by a cylindrical section 267 including walls extending substantially normal to the surface 235 and substantially parallel to the inspection casing centerline 221. The oblique walls of the conical section 266 converge towards the surface 235 of the partition wall. In the non limitative embodiment shown, the apex of the conical section 266, i.e. its narrowest section, contacts the partition wall 235 and is even mounted thereto.

The optical unit 241 further includes one or more recesses 269 defined in a peripheral wall thereof. In the embodiment shown in FIG. 16, the optical unit 241 includes one recess 269 defining a 45 degree flat mirror 284. As mentioned above, one or more LEDs 237b is located under the recessed flat mirror 284 of the light redirecting module 232 to direct light towards same. As mentioned above, the LEDs 237b are designed to project a narrow light beam towards the mirror 284, which is then reflected peripherally, i.e. substantially normal to the inspection casing centerline 221 and towards the light-permeable sidewall section 227b.

The spaced apart lighting devices 237a, 237b, 137c in combination with the optical unit 141 are configured so as to emit light according to 360 degrees pattern relatively to the inspection casing centerline 221 and forwardly of the inspection casing 220, away from the casing inspection end 219. Each one of the lighting-emitting devices 237a, 237b is operatively connected to the power supply or rechargeable battery module 234 and is adapted to direct at least some of the light emitted in a direction radially away from, or normal to, and/or at an oblique angle with respect to the inspection casing centerline 221.

Figure 18:
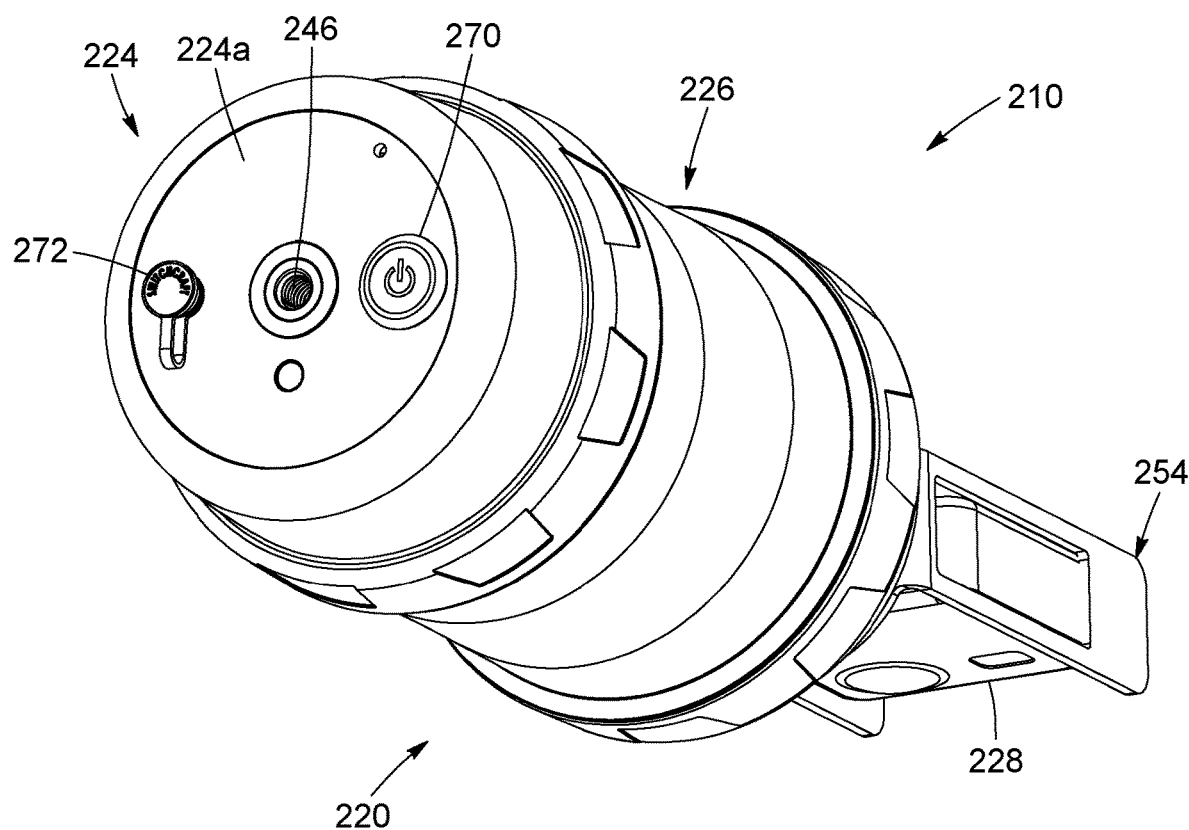
FIG. 18 is a top perspective view of the inspection casing shown in FIG. 13, wherein a manipulation shaft has been detached and removed.

Turning now to FIGS. 15 and 18, the shaft connecting end portion 224 will be described in further details. In the non-limitative embodiment shown, the power supply connector 272 (to recharge the rechargeable battery module 234, if any) and a power interrupter (on-off switch) 270 are provided the casing connecting end wall 224a. An internally threaded channel 46 formed through the shaft connecting end portion 24, centrally of the casing connecting end wall 224a. The internally threaded channel 246 is engageable by a casing mounting end 214 of the elongated manipulation shaft 212 to detachably mount the shaft 212 to the inspection casing 220, at a connecting end 218.

In accordance with a further embodiment, there is provided an inspection system for visually inspecting the substantially dark environment. The inspection system comprises an inspection apparatus, in some implementations, the inspection apparatus 10, 110 or 210, and a computer readable media operatively and remotely connected to the omnidirectional video camera 28, 128 or 228 so as to receive the 360-degree imaging of the external environment. In some implementations, the computer readable media can be wirelessly connected to the inspection apparatus and can include, for example, a smart phone or tablet. In some implementations, the computer readable media can further be operatively connected to the lighting assembly 30, 130 or 230 so as to remotely control the light emissions emitted from the inspection apparatus 10, 110 or 210. Therefore, a user or operator of the system can remotely control the omnidirectional video camera 28, 128 or 228 and/or the lighting assembly 30, 130 or 230 (using a remote controller for example) and have access, in real time, to the 360-degree imaging.

The inspection apparatuses and systems described above provide the operator with a full illumination and imaging of a previously substantially dark environment (vertically and horizontally) and therefore can speed up the inspection time. Furthermore, no cable is required, thanks to the rechargeable battery module which is operatively connected to the lighting assembly. The apparatus described above is, additionally, light and compact, facilitating the on-site inspection. For example, no heavy material or instrument needs to be installed on ground surface to control the apparatus. The apparatus or system is also very convenient as it can be used with conventional omnidirectional video cameras available on the market (which allow image and sound capture in real time, while providing x, y and z coordinates and cardinal direction angle in real time) and/or smartphone devices or tablets.

In some implementations, the apparatus is also completely waterproof so it can conveniently be used for inspecting piping such as the one provided for rain and waste water disposal. The compact configuration of the apparatus also allows its usage in restraint cavities, such as pipes of areas of 4-inch diameters and greater.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. An inspection apparatus for visually inspecting a substantially dark area or a physically constrained area, the inspection apparatus comprising:

an inspection casing having a sidewall extending between a casing inspection end and a connecting end, the sidewall having at least one sidewall light-permeable section and the inspection casing defining an inspection casing centerline crossing the casing inspection end and the connection end, the inspection casing comprising a central section, a partition wall, and a casing inspection end portion including at least partially the at least one sidewall light- permeable section and delimiting at least partially a light-emitting compartment, the partition wall separates the light-emitting compartment from the central section;

a video camera coupled at the casing inspection end of the inspection casing and providing a 360 degrees field of view in at least one plane extending normal to the inspection casing centerline and including at least two camera lenses outwardly exposed in opposed directions;

a camera protection assembly mounted to at least one of the inspection casing and the video camera and protruding forwardly therefrom and including at least one post guard having a section extending forwardly of the video camera; and a light-emitting assembly at least partially contained in the inspection casing and configured to emit light through the at least one sidewall light-permeable section of the sidewall of the inspection casing and away therefrom, wherein the light-emitting assembly comprises a plurality of spaced-apart light-emitting devices mounted to the partition wall and a light redirecting module, the light-emitting devices being at least partially contained in the light-emitting compartment, the light redirecting module being located in the light-emitting compartment and redirecting at least some of a light emitted from the light-emitting devices radially and outwardly of the inspection casing in a 360-degree lighting pattern and forwardly of the inspection casing through the at least one sidewall light-permeable section.

2. The inspection apparatus as claimed in claim 1, wherein the inspection casing comprises a casing inspection end wall having at least one end wall light-permeable section and the light-emitting assembly emits light from the casing inspection end of the inspection casing and away therefrom.

3. The inspection apparatus as claimed in claim 2, wherein at least one of: the video camera extends forwardly of the casing inspection end wall and outwardly of the inspection casing; and the casing inspection end wall is light permeable.

4. The inspection apparatus as claimed in claim 1, wherein the video camera is at least one of detachably rotatably and detachably pivotably mounted to the casing inspection end of the inspection casing and the camera protection assembly protrudes forwardly from the casing inspection end of the inspection casing.

5. The inspection apparatus as claimed in claim 1, wherein the at least one post guard comprises a plurality of spaced-apart post guards extending peripherally of the video camera.

6. The inspection apparatus as claimed in claim 1, wherein the casing inspection end portion is detachably mounted to the central section and defines therewith the light-emitting compartment containing at least partially the light-emitting assembly.

7. The inspection apparatus as claimed in claim 6, wherein at least one of:
the central section defines a power supply receiving compartment and the light- emitting assembly comprises a power supply at least partially contained in the power supply receiving compartment; and
the casing inspection end portion is made of a light-permeable material.

8. The inspection apparatus as claimed in claim 1, wherein the light redirecting module comprises an optical unit including at least one peripheral wall wherein the at least one peripheral wall converges towards the partition wall with the light emitted from the lighting-emitting devices being at least partially directed towards the at least one peripheral wall of the optical unit.

9. The inspection apparatus as claimed in claim 8, wherein the at least one peripheral wall of the optical unit defines at least one of a frusto-conical shape, a truncated hemisphere shape, a truncated pyramid shape, and a conical shape.

10. The inspection apparatus as claimed in claim 8, wherein the at least one peripheral wall of the optical unit is made of one of a light-permeable material and a light-reflective material.

11. The inspection apparatus as claimed in claim 8, wherein the optical unit comprises one or more recesses defined in the at least one peripheral wall with a recessed flat mirror defining an oblique angle with the partition wall being located within the one or more recesses and wherein at least one of the light emitting devices is superposed to the partition wall and is aligned with the recesses in a direction of an inspection casing centerline.

12. The inspection apparatus as claimed in claim 1, wherein the light-emitting assembly comprises a power supply including at least one rechargeable battery contained in the inspection casing and the inspection casing comprises at least one power supply connector operatively connected to the rechargeable battery to recharge same.

13. A visual inspection system comprising the inspection apparatus as defined in claim 1 and further comprising at least one of:
a telescopic manipulation shaft having a casing connecting end detachably securable to the inspection casing, and
a computer readable media operatively and remotely connected to the video camera for receiving imaging from the video camera.

14. A visual inspection apparatus of a physically constrained area, the visual inspection apparatus comprising:
an inspection casing having a sidewall extending between a casing inspection end and a connecting end, the inspection casing having a peripheral light-permeable section provided in the sidewall, the inspection casing comprising a casing inspection end portion including at least partially the peripheral light-permeable section and delimiting at least partially a light-emitting compartment;
a video camera having a 360 degrees field of view in at least one plane, the 360 degrees field of view surrounding the sidewall of the inspection casing, the video camera being mounted to the casing inspection end of the inspection casing and protruding forwardly and outwardly of the inspection casing, the video camera including two sidewalls extending parallel to one another, each one of the sidewalls of the video camera having a camera lens exposed outwardly;
a camera protection assembly mounted to at least one of the inspection casing and the video camera and protruding forwardly from the video camera; and
a light-emitting assembly at least partially disposed within the inspection casing and comprising a plurality of spaced-apart light-emitting devices configured to emit light through the peripheral light-permeable section and outwardly of the inspection casing, and configured to illuminate the 360 degrees field of view of the video camera, wherein the light-emitting assembly comprises a light redirecting module located in the light-emitting compartment, the light redirecting module redirecting at least some of a light emitted from the light-emitting devices radially and outwardly of the inspection casing in a 360-degree lighting pattern and forwardly of the inspection casing through the peripheral light-permeable section.

15. The visual inspection apparatus of claim 14, wherein the camera protection assembly further comprises at least one post guard having a section extending forwardly of the video camera.

16. The visual inspection apparatus of claim 14, wherein the peripheral light-permeable section extends along 360 degrees.

17. The visual inspection apparatus of claim 14, wherein the inspection casing further comprises a central section and a partition wall, the partition wall separating the light-emitting compartment from the central section, wherein the plurality of spaced-apart light-emitting devices are mounted to the partition wall.

18. A visual inspection apparatus of a physically constrained area, the visual inspection apparatus comprising:

an inspection casing having a sidewall extending between a casing inspection end and a connecting end, the inspection casing comprising a casing inspection end portion including at least partially a peripheral light-permeable section and delimiting at least partially a light-emitting compartment;

a video camera providing a full 360 degrees viewing surrounding the sidewall of the inspection casing, the video camera being mounted to the casing inspection end of the inspection casing and protruding forwardly of the inspection casing, the video camera including two sidewalls extending parallel to one another, each one of the sidewalls of the video camera having a camera lens exposed outwardly;

a camera protection assembly mounted to at least one of the inspection casing and the video camera and protruding forwardly of the video camera; and a light-emitting assembly mounted to at least one of the inspection casing and the video camera, the light-emitting assembly being configured to illuminate the full 360 degrees viewing of the video camera and forwardly of the video camera and comprising a plurality of spaced-apart light-emitting devices and a light redirecting module, the light-emitting devices being at least partially contained in the light-emitting compartment, the light redirecting module being located in the light-emitting compartment and redirecting at least some of a light emitted from the light-emitting devices radially and outwardly of the inspection casing in a 360-degree lighting pattern and forwardly of the inspection casing through the peripheral light-permeable section.

19. The visual inspection apparatus of claim 18, wherein the camera protection assembly further comprises at least one post guard having a section extending forwardly of the video camera.

20. The visual inspection apparatus of claim 18, wherein the inspection casing further comprises a central section and a partition wall, the partition wall separating the light-emitting compartment from the central section, wherein the plurality of spaced-apart light-emitting devices are mounted to the partition wall.

\* \* \* \* \*